United States Patent
Araki et al.

(10) Patent No.: US 8,349,198 B2
(45) Date of Patent: Jan. 8, 2013

(54) METHOD OF MANUFACTURING NEAR-FIELD LIGHT GENERATOR INCLUDING WAVEGUIDE AND PLASMON GENERATOR

(75) Inventors: Hironori Araki, Milpitas, CA (US); Yoshitaka Sasaki, Milpitas, CA (US); Hiroyuki Ito, Milpitas, CA (US); Shigeki Tanemura, Milpitas, CA (US); Kazuo Ishizaki, Milpitas, CA (US); Takehiro Horinaka, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 332 days.

(21) Appl. No.: 12/814,669

(22) Filed: Jun. 14, 2010

(65) Prior Publication Data

US 2011/0303637 A1    Dec. 15, 2011

(51) Int. Cl.
     *B29D 11/00*      (2006.01)
(52) U.S. Cl. .................. 216/24; 369/13.33; 369/13.13; 369/13.32; 369/13.17; 360/59
(58) Field of Classification Search .................. 216/24, 216/37; 369/13.24; 385/47, 49, 9
See application file for complete search history.

(56) References Cited

U.S. PATENT DOCUMENTS

| | | | |
|---|---|---|---|
| 7,910,011 B2 | 3/2011 | Araki et al. | |
| 7,911,883 B2 * | 3/2011 | Sasaki et al. | 369/13.33 |
| 8,000,178 B2 | 8/2011 | Shimazawa et al. | |
| 8,089,830 B2 | 1/2012 | Isogai et al. | |
| 2008/0055762 A1 | 3/2008 | Shimazawa et al. | |
| 2009/0294402 A1 | 12/2009 | Araki et al. | |
| 2010/0103553 A1 | 4/2010 | Shimazawa et al. | |
| 2010/0290323 A1 | 11/2010 | Isogai et al. | |

FOREIGN PATENT DOCUMENTS

| | | |
|---|---|---|
| JP | 2009-289388 | 12/2009 |
| JP | 2010-108584 | 5/2010 |
| JP | 2010-267364 | 11/2010 |

OTHER PUBLICATIONS

U.S. Appl. No. 12/457,984, filed Jun. 26, 2009.
U.S. Appl. No. 12/453,508, filed May 13, 2009.
Apr. 28, 2011 Office Action issued in U.S. Appl. No. 12/453,508.
Office Action dated Oct. 2, 2012 issued in Japanese Patent Application No. 2010-283227 (with translation).

* cited by examiner

*Primary Examiner* — Nadine Norton
*Assistant Examiner* — Maki Angadi
(74) *Attorney, Agent, or Firm* — Oliff & Berridge, PLC

(57) ABSTRACT

A near-field light generator includes: a waveguide; a clad layer having a penetrating opening and disposed on the waveguide; a plasmon generator accommodated in the opening; and a dielectric film interposed between the plasmon generator and each of the waveguide and the clad layer. In a method of manufacturing the near-field light generator, an initial clad layer is initially formed on the waveguide, and then the initial clad layer is taper-etched by RIE to form a recess that does not reach the top surface of the waveguide. Subsequently, the recess is etched by wet etching until the top surface of the waveguide is exposed in part. Next, the dielectric film is formed in the opening, and the plasmon generator is formed on the dielectric film.

8 Claims, 16 Drawing Sheets

METHOD OF MANUFACTURING NEAR-FIELD LIGHT GENERATOR INCLUDING WAVEGUIDE AND PLASMON GENERATOR

BACKGROUND OF THE INVENTION

1. Field of the Invention

The present invention relates to a method of manufacturing a near-field light generator for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technique so-called thermally-assisted magnetic recording. This technique uses a recording medium having high coercivity. When writing data, a magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to apply laser light to a plasmon antenna, which is a small piece of metal, as described in U.S. Patent Application Publication No. 2008/0055762 A1, for example. The laser light applied to the plasmon antenna excites surface plasmons on the plasmon antenna, and near-field light is generated based on the surface plasmons. The near-field light generated by the plasmon antenna exists only within an area smaller than the diffraction limit of light. Irradiating the recording medium with the near-field light makes it possible to heat only a small area of the recording medium.

In a conventional thermally-assisted magnetic recording head, the plasmon antenna is directly irradiated with laser light, so that the plasmon antenna transforms the laser light into near-field light. In this case, there is the problem of poor use efficiency of the laser light since the laser light can be reflected at the surface of the plasmon antenna or can be transformed into thermal energy and absorbed by the plasmon antenna.

Having a size smaller than the wavelength of the light, the conventional plasmon antenna is small in volume. The conventional plasmon antenna therefore shows a large increase in temperature when absorbing the thermal energy. This results in problems such as the problem that the plasmon antenna expands and protrudes from a medium facing surface, a surface that faces the recording medium, to damage the recording medium.

To cope with this, there has been proposed the technique of arranging the outer surface of a plasmon generator, a piece of metal that generates near-field light, to face the outer surface of a waveguide (core) with a predetermined distance therebetween, and exciting surface plasmons on the plasmon generator by utilizing evanescent light that results from total reflection of the light propagated through the waveguide at the outer surface of the waveguide.

The thermally-assisted magnetic recording head can be configured so that the plasmon generator has an edge part that faces the outer surface of the waveguide with a predetermined distance therebetween. In such a configuration, a clad having a refractive index lower than that of the waveguide is interposed in part between the outer surface of the waveguide and the plasmon generator. In the foregoing plasmon generator, an end of the edge part that is located in the medium facing surface functions as a near-field light generating part. In the plasmon generator, surface plasmons are excited on the edge part based on the evanescent light occurring on the outer surface of the waveguide. The surface plasmons are propagated along the edge part to the near-field light generating part, and near-field light occurs from the near-field light generating part based on the surface plasmons. This configuration allows the surface plasmons excited on the edge part of the plasmon generator to be propagated efficiently to the near-field light generating part.

In the foregoing configuration, it is important to appropriately control the distance between the outer surface of the waveguide and the edge part of the plasmon generator in order to appropriately excite the surface plasmons on the edge part of the plasmon generator. In addition, in order to increase the recording density of the magnetic recording device, it is preferred that the near-field light be smaller in spot diameter. In order to reduce the spot diameter when the foregoing configuration is employed, it is effective to reduce the radius of curvature of the end of the edge part located in the medium facing surface.

The plasmon generator in the foregoing configuration can be formed by the following method. In the method, a dielectric layer is initially formed on the waveguide. Next, a groove that is V-shaped in cross section parallel to the medium facing surface is formed in the dielectric layer. The groove is formed so that its bottom does not reach the outer surface (top surface) of the waveguide. Next, a dielectric film is formed along the surface of the groove. The plasmon generator is then formed on the dielectric film. The dielectric layer and the dielectric film constitute part of the clad.

The above-described method of forming the plasmon generator has the problem that the distance between the outer surface of the waveguide and the edge part of the plasmon generator varies due to variations in the depth of the groove. The above-described method of forming the plasmon generator further has the problem that the edge part of the plasmon generator can be rounded, which makes it difficult to reduce the radius of curvature of the edge part, and consequently, it is difficult to reduce the spot diameter of the near-field light.

OBJECT AND SUMMARY OF THE INVENTION

It is a first object of the present invention to provide a method of manufacturing a near-field light generator including a waveguide and a plasmon generator that are arranged so that the outer surface of the waveguide and the edge part of the plasmon generator face each other, the near-field light generator being capable of reducing variations in the distance between the outer surface of the waveguide and the edge part of the plasmon generator.

In addition to the first object, it is a second object of the present invention to provide a method of manufacturing a near-field light generator that can reduce the radius of curvature of the edge part of the plasmon generator.

A near-field light generator to be manufactured by a first manufacturing method of the present invention includes: a waveguide that propagates light and has a top surface; a clad layer that has a bottom surface in contact with the top surface of the wave guide, a top surface opposite to the bottom surface, and an opening penetrating from the top surface to the bottom surface; a plasmon generator that is accommodated in the opening at least in part; and a dielectric film that is provided in the opening so as to be interposed between the plasmon generator and each of the waveguide and the clad layer.

Each of the clad layer and the dielectric film has a refractive index lower than that of the waveguide. The opening has a first opening sidewall and a second opening sidewall that decrease in distance from each other with decreasing distance to the top surface of the waveguide. The plasmon generator has a first inclined surface that is opposed to the first opening sidewall, a second inclined surface that is opposed the second opening sidewall, an edge part that connects the first and second inclined surfaces to each other, and a near-field light generating part that lies at an end of the edge part and generates near-field light. A surface plasmon is excited on the edge part through coupling with evanescent light that occurs at the top surface of the waveguide based on the light propagated through the waveguide. The surface plasmon is propagated along the edge part to the near-field light generating part. The near-field light generating part generates near-field light based on the surface plasmon.

The first manufacturing method for the near-field light generator includes the steps of forming the waveguide; forming an initial clad layer on the waveguide, the initial clad layer being intended to undergo the formation of the opening therein later to thereby become the clad layer; etching the initial clad layer by reactive ion etching so that a recess that does not reach the top surface of the waveguide is formed in the initial clad layer; etching the recess by wet etching until the top surface of the waveguide is exposed in part, so that the recess becomes the opening and the initial clad layer becomes the clad layer; forming the dielectric film in the opening; and forming the plasmon generator on the dielectric film.

In the first manufacturing method for the near-field light generator of the present invention, the initial clad layer may be formed of alumina. The step of etching the initial clad layer may use an etching gas that contains $Cl_2$ and $BCl_3$, and at least one of $N_2$ and $CF_4$.

In the first manufacturing method for the near-field light generator of the present invention, the step of etching the recess may be performed under such a condition that the etching stops at the top surface of the wave guide. In such a case, the waveguide may be formed of tantalum oxide, the initial clad layer may be formed of alumina, and the step of etching the recess may use an etchant that contains tetramethyl ammonium hydroxide or KOH.

In the first manufacturing method for the near-field light generator of the present invention, the dielectric film may be formed by atomic layer deposition.

A near-field light generator to be manufactured by a second manufacturing method of the present invention includes: a waveguide that propagates light and has a top surface and a groove, the groove being opened in the top surface and being oblong in a direction parallel to the top surface; a clad layer that has a bottom surface in contact with the top surface of the waveguide, a top surface opposite to the bottom surface, and an opening penetrating from the top surface to the bottom surface, the opening being continuous with the groove; a plasmon generator that is accommodated in the opening at least in part; and a dielectric film that is provided in the groove and the opening so as to be interposed between the plasmon generator and each of the waveguide and the clad layer.

Each of the clad layer and the dielectric film has a refractive index lower than that of the waveguide. The opening has a first opening sidewall and a second opening sidewall that decrease in distance from each other with decreasing distance to the top surface of the waveguide. The groove has a first groove sidewall that is continuous with the first opening sidewall, and a second groove sidewall that is continuous with the second opening sidewall. The plasmon generator has a first inclined surface that is opposed to the first opening sidewall and the first groove sidewall, a second inclined surface that is opposed to the second opening sidewall and the second groove sidewall, an edge part that connects the first and second inclined surfaces to each other, and a near-field light generating part that lies at an end of the edge part and generates near-field light. A surface plasmon is excited on the edge part through coupling with evanescent light that occurs at a surface of the groove based on the light propagated through the waveguide. The surface plasmon is propagated along the edge part to the near-field light generating part. The near-field light generating part generates near-field light based on the surface plasmon.

The second manufacturing method for the near-field light generator includes the steps of forming an initial waveguide that is intended to undergo the formation of the groove therein later to thereby become the waveguide; forming an initial clad layer on the initial waveguide, the initial clad layer being intended to undergo the formation of the opening therein later to thereby become the clad layer; continuously etching the initial clad layer and the initial waveguide by reactive ion etching so that the opening and the groove are formed, whereby the initial waveguide becomes the waveguide and the initial clad layer becomes the clad layer; forming the dielectric film in the opening and the groove; and forming the plasmon generator on the dielectric film.

The step of continuously etching the initial clad layer and the initial waveguide is performed under such a condition that the initial waveguide has en etching rate higher than that of the initial clad layer. As a result, the first and second groove sidewalls form greater angles with respect to a virtual plane parallel to the top surface of the waveguide than angles that the first and second opening sidewalls form with respect to the virtual plane, respectively. The formation of dielectric film in the opening and the groove and the formation of the plasmon generator on the dielectric film result in that each of the first and second inclined surfaces includes an upper part and a lower part that are continuous with each other and the lower parts of the first and second inclined surfaces form greater angles with respect to the virtual plane than angles that the upper parts of the first and second inclined surfaces form with respect to the virtual plane, respectively.

In the second manufacturing method for the near-field light generator of the present invention, the initial waveguide may be formed of tantalum oxide, and the initial clad layer may be formed of alumina. In such a case, the step of continuously etching the initial clad layer and the initial waveguide may use an etching gas that contains $Cl_2$ and $BCl_3$, and at least one of $N_2$ and $CF_4$.

In the second manufacturing method for the near-field light generator of the present invention, the dielectric film may be formed by atomic layer deposition.

According to the first manufacturing method of the present invention, the step of etching the recess by wet etching forms the opening so that the top surface of the waveguide is exposed in part. Subsequently, the dielectric film is formed in the opening, and the plasmon generator is formed on the dielectric film. The distance between the outer surface (top surface) of the waveguide and the edge part of the plasmon generator is thus determined by the thickness of the dielectric film. Consequently, according to the present invention, it is possible to reduce variations in the distance between the outer surface (top surface) of the waveguide and the edge part of the plasmon generator.

According to the second manufacturing method of the present invention, the opening of the clad layer and the groove of the waveguide are formed by continuously etching the initial clad layer and the initial waveguide by reactive ion etching. Subsequently, the dielectric film is formed in the opening and the groove, and the plasmon generator is formed on the dielectric film. The distance between the outer surface of the waveguide (the surface of the groove) and the edge part of the plasmon generator is thus determined by the thickness of the dielectric film. Consequently, according to the present invention, it is possible to reduce variations in the distance between the outer surface of the waveguide (the surface of the groove) and the edge part of the plasmon generator. Moreover, according to the second manufacturing method of the present invention, each of the first and second inclined surfaces of the plasmon generator includes the upper part and the lower part continuous with each other. The angles that the lower parts of the first and second inclined surfaces form with respect to a virtual plane parallel to the top surface of the waveguide are greater than the angles that the upper parts of the first and second inclined surfaces form with respect to the virtual plane, respectively. According to the present invention, it is therefore possible to reduce the radius of curvature of the edge part of the plasmon generator, whereby the near-field light can be made small in spot diameter.

Other and further objects, features and advantages of the present invention will appear more fully from the following description.

DETAILED DESCRIPTION OF THE PREFERRED EMBODIMENTS

First Embodiment

Figure 1:
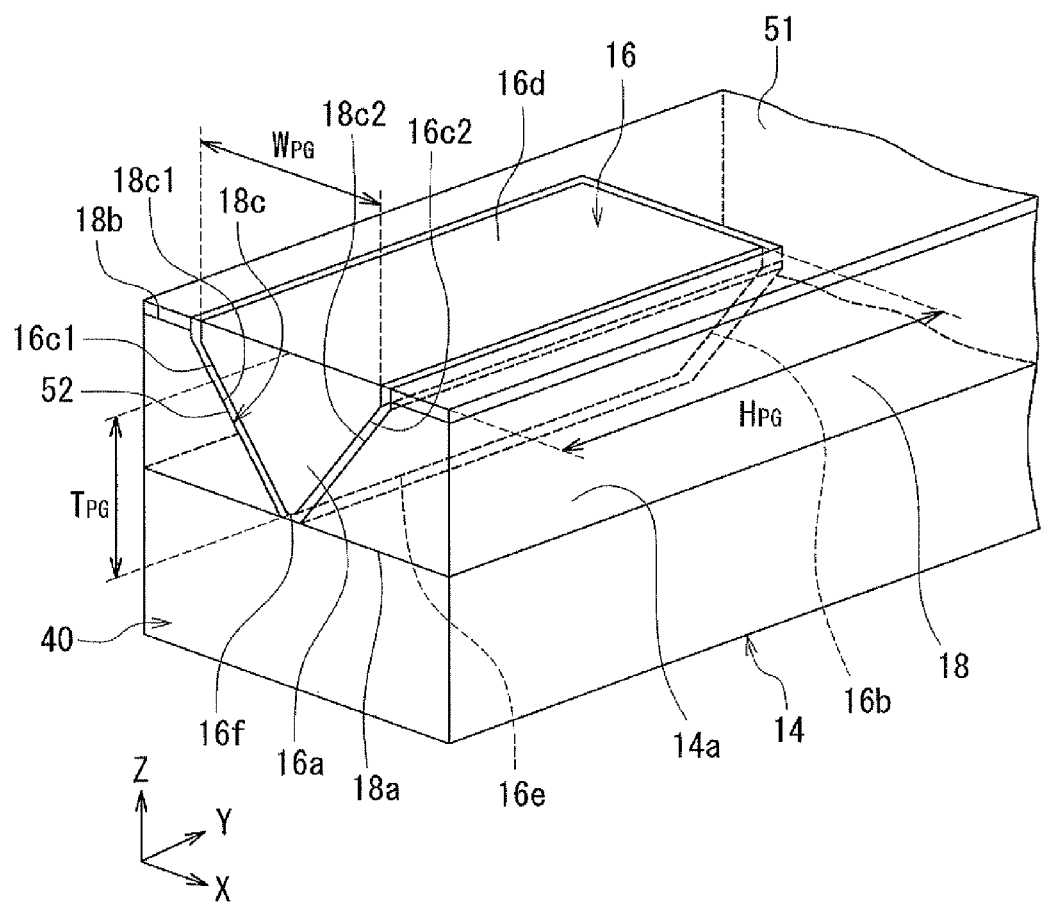
FIG. 1 is a perspective view showing the main part of a thermally-assisted magnetic recording head according to a first embodiment of the invention.
Figure 2:
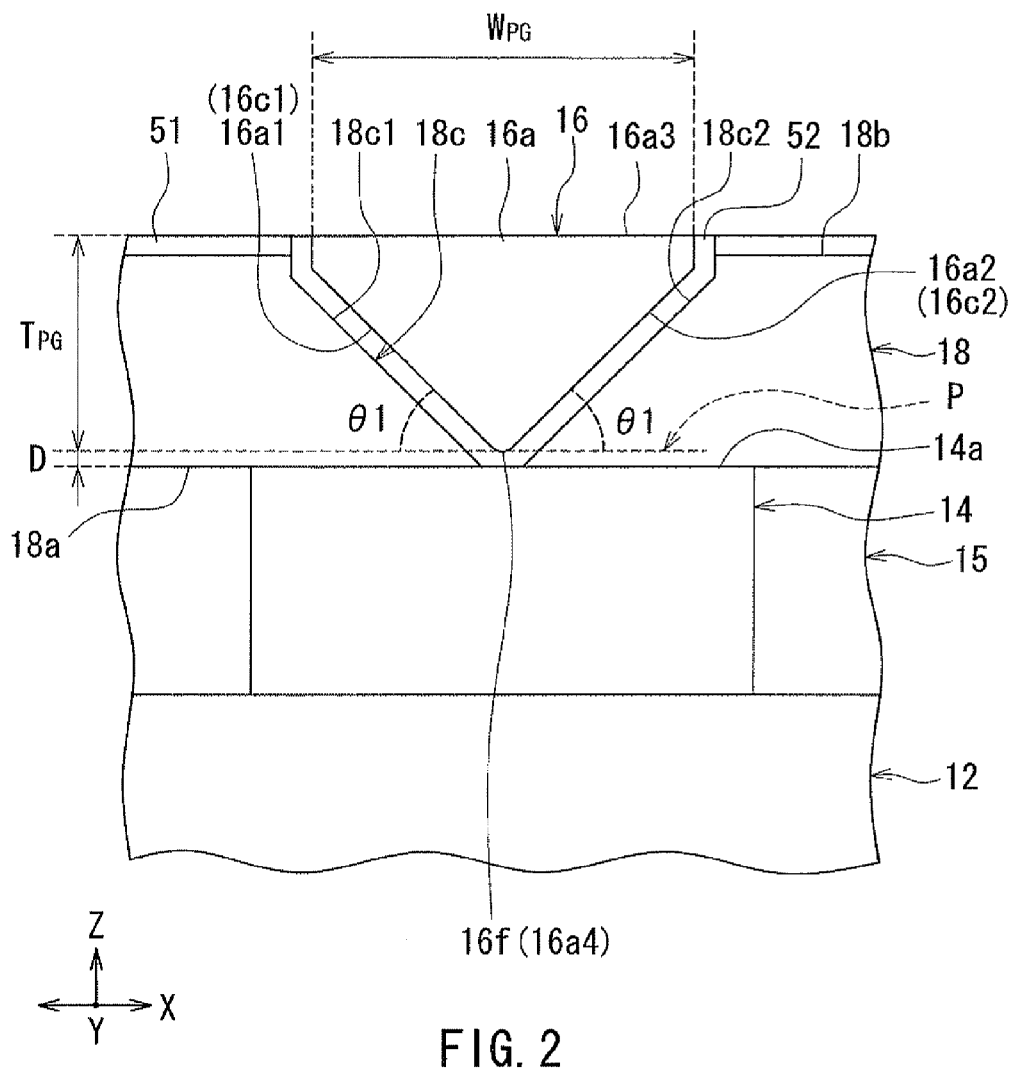
FIG. 2 is a front view showing a part of the medium facing surface of the thermally-assisted magnetic recording head according to the first embodiment of the invention.
Figure 3:
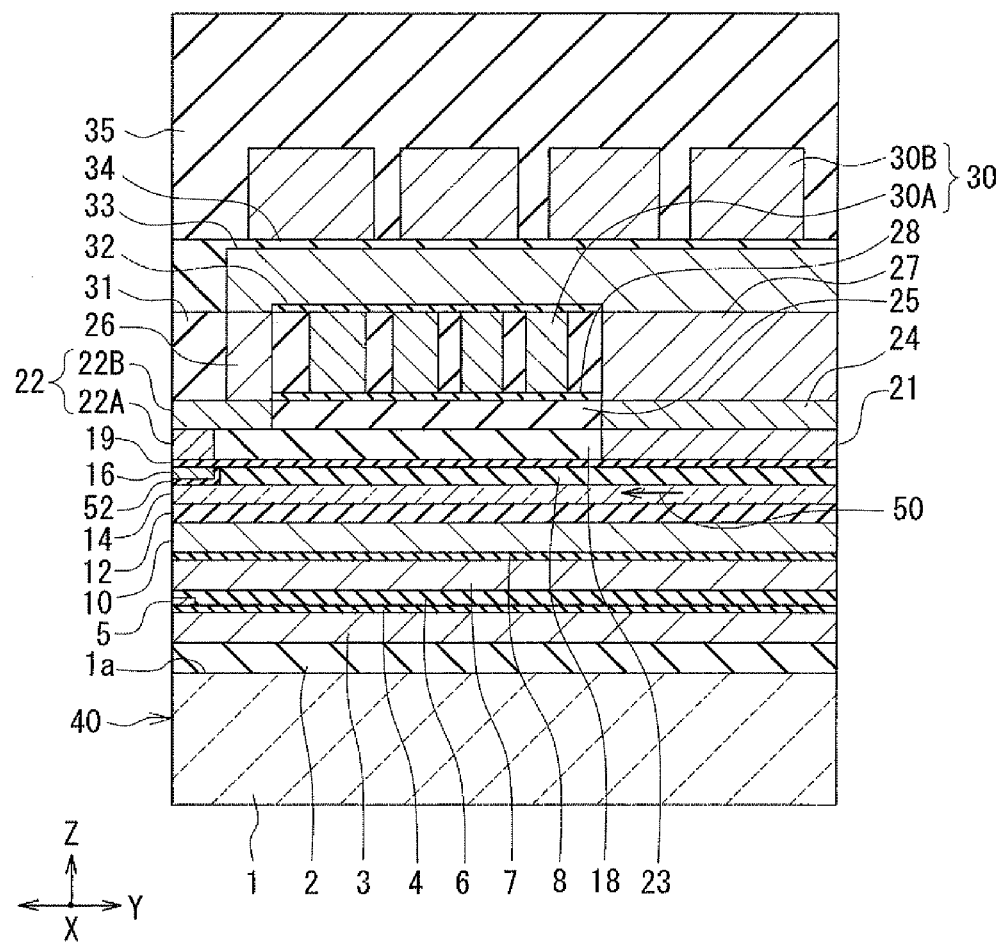
FIG. 3 is a cross-sectional view showing the configuration of the thermally-assisted magnetic recording head according to the first embodiment of the invention.
Figure 4:
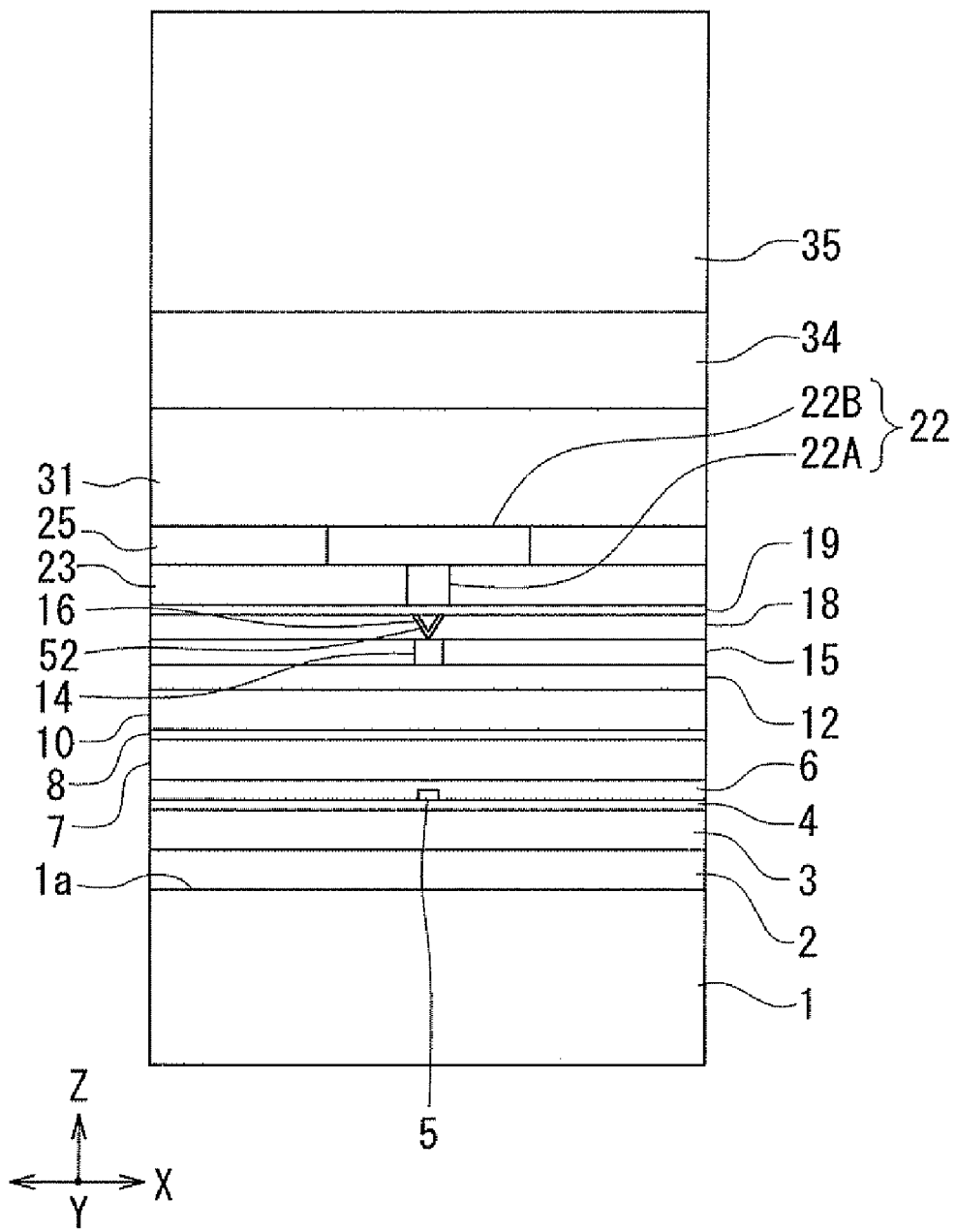
FIG. 4 is a front view showing the medium facing surface of the thermally-assisted magnetic recording head according to the first embodiment of the invention.
Figure 5:
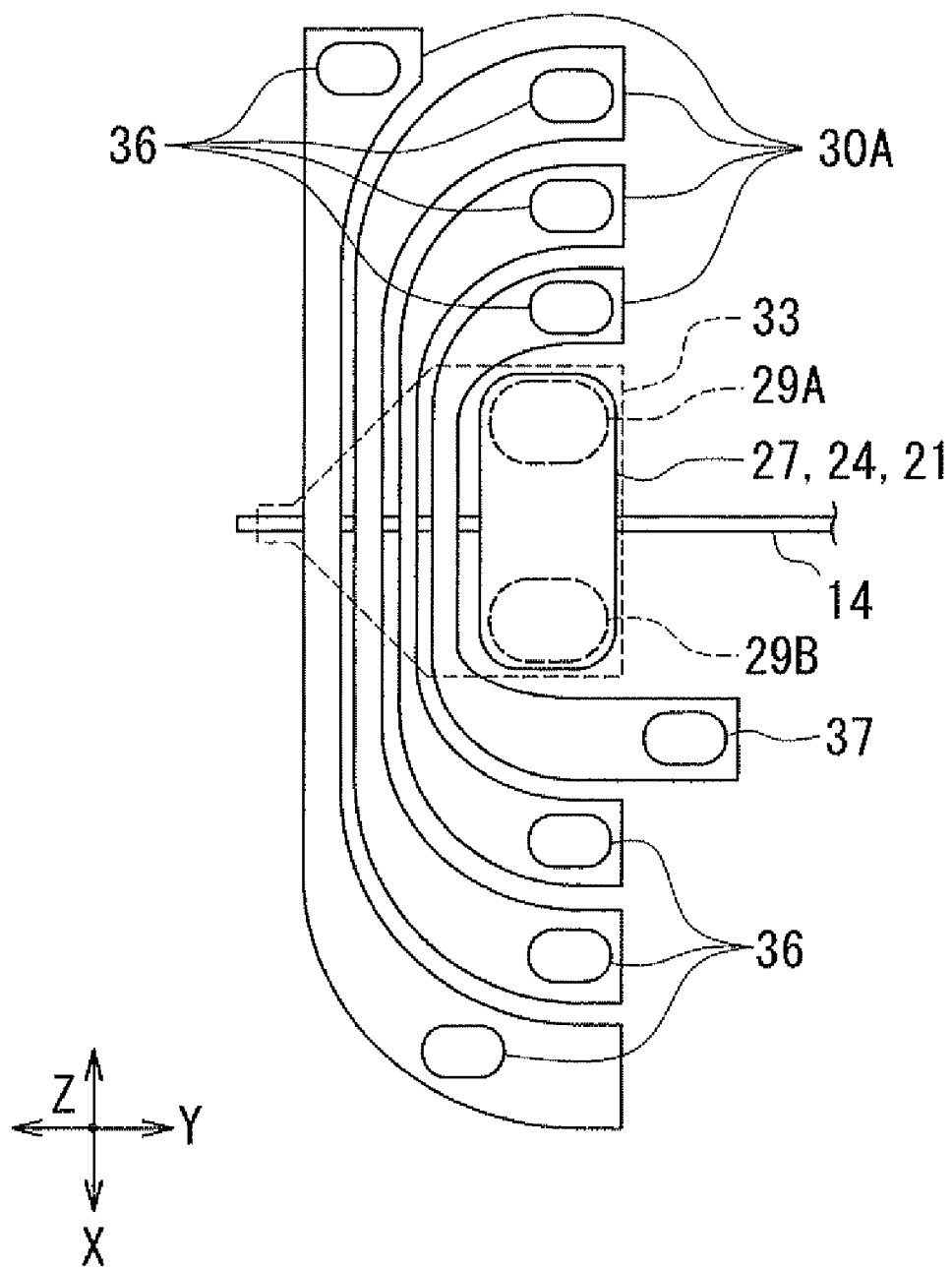
FIG. 5 is a plan view showing a first layer of a coil of the thermally-assisted magnetic recording head according to the first embodiment of the invention.
Figure 6:
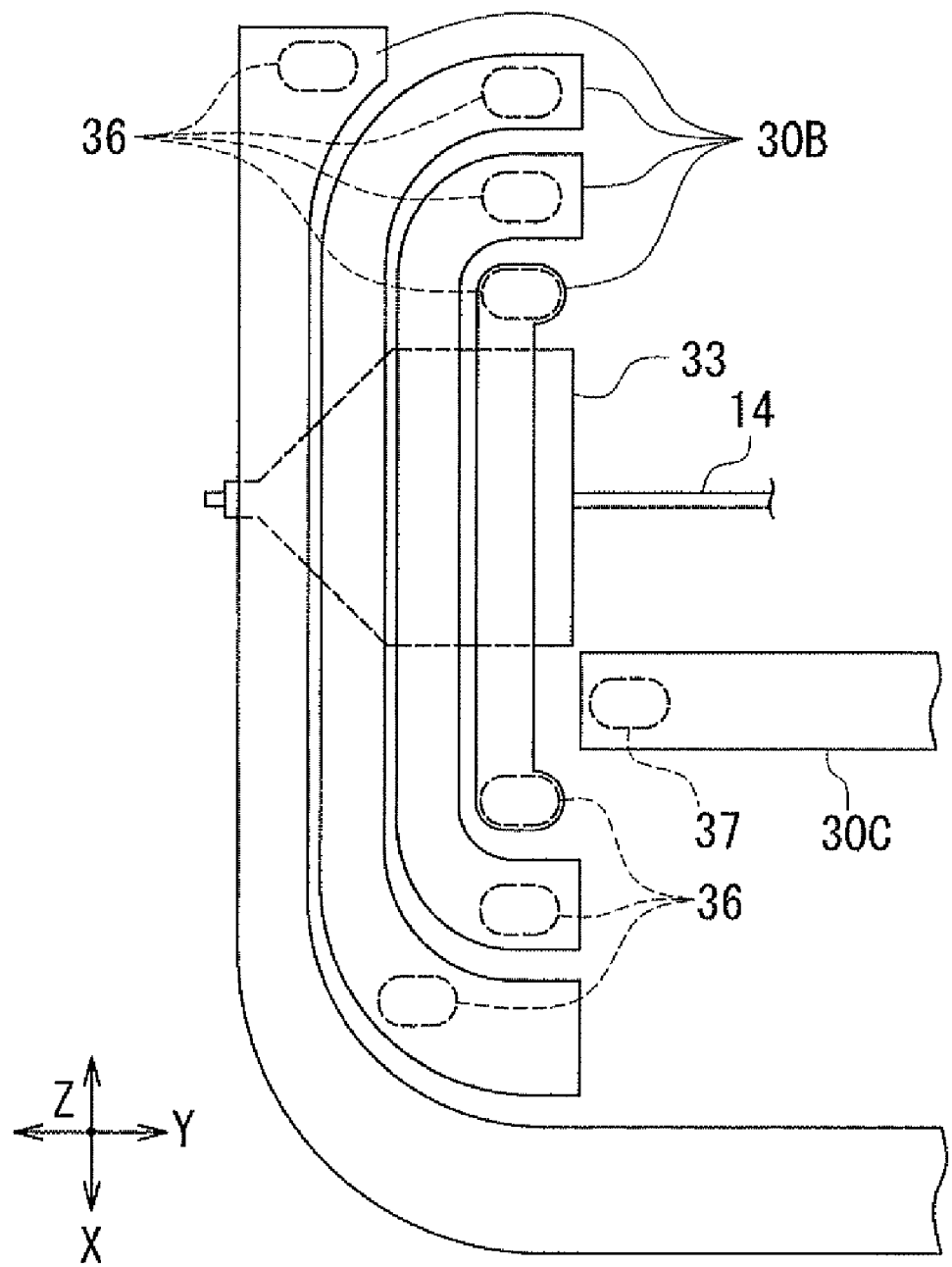
FIG. 6 is a plan view showing a second layer of the coil of the thermally-assisted magnetic recording head according to the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is a front view showing a part of the medium facing surface of the thermally-assisted magnetic recording head. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a first layer of a coil of the thermally-assisted magnetic recording head. FIG. 6 is a plan view showing a second layer of the coil of the thermally-assisted magnetic recording head.

The thermally-assisted magnetic recording head according to the present embodiment is for use in perpendicular magnetic recording, and is in the form of a slider that flies over the surface of a recording medium that is driven to rotate. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 40 to face the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 3 and FIG. 4, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; and a bottom shield layer 3 made of a magnetic material and disposed on the insulating layer 2. The insulating layer 2 is made of alumina ($Al_2O_3$), for example.

The thermally-assisted magnetic recording head further includes: a bottom shield gap film 4 which is an insulating film disposed on the top surface of the bottom shield layer 3; a magnetoresistive (MR) element 5 as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6.

An end of the MR element 5 is located in the medium facing surface 40 which faces the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. If the MR element 5 is a TMR element or a CPP-type GMR element, the bottom shield layer 3 and the top shield layer 7 may also function as the two leads, with the top surface of the bottom shield layer 3 in contact with the bottom surface of the MR element 5 and the bottom surface of the top shield layer 7 in contact with the top surface of the MR element 5. The parts from the bottom shield layer 3 to the top shield layer 7 constitute a read head.

The thermally-assisted magnetic recording head further includes: a nonmagnetic layer 8 made of a nonmagnetic material and disposed on the top surface of the top shield layer 7; and a return magnetic pole layer 10 made of a magnetic material and disposed on the nonmagnetic layer 8. The nonmagnetic layer 8 is made of alumina, for example.

The thermally-assisted magnetic recording head further includes a clad layer 12 disposed on the top surface of the return magnetic pole layer 10, a waveguide (core) 14 disposed on the clad layer 12, and a clad layer 15 disposed around the waveguide 14 on the clad layer 12. As shown in FIG. 1 and FIG. 2, the waveguide 14 has a top surface 14a that is farther from the top surface 1a of the substrate 1. The top surface 14a of the waveguide 14 is even with the top surface of the clad layer 15.

The thermally-assisted magnetic recording head further includes a clad layer 18 disposed over the waveguide 14 and the clad layer 15, and a mask layer 51 disposed on the clad layer 18. Note that the mask layer 51 is omitted in FIG. 3 and FIG. 4. The clad layer 18 has a bottom surface 18a in contact with the top surface 14a of the waveguide 14, a top surface 18b opposite to the bottom surface, and an opening 18c that penetrates from the top surface 18b to the bottom surface 18a. The opening 18c has a first opening sidewall 18c1 and a second opening sidewall 18c2 that decrease in distance from each other with decreasing distance to the top surface 14a of the waveguide 14.

As shown in FIG. 1 and FIG. 2, the mask layer 51 has a penetrating opening. The edge of the opening of the mask layer 51 is located directly above the edge of the opening 18c in the top surface 18b of the clad layer 18. The mask layer 51 is made of a photoresist or a metal material.

The waveguide 14 is made of a dielectric material that transmits laser light to be used for generating near-field light. The laser light emitted from a not-shown laser diode enters the waveguide 14 and is propagated through the waveguide 14. The clad layers 12, 15, and 18 are each made of a dielectric material that has a refractive index lower than that of the waveguide 14. For example, the waveguide 14 can be made of tantalum oxide such as $Ta_2O_5$ which has a refractive index of approximately 2.1, and the clad layers 12, 15, and 18 can be made of alumina which has a refractive index of approximately 1.8.

The thermally-assisted magnetic recording head further includes a dielectric film 52 and a plasmon generator 16. At least part of the plasmon generator 16 is accommodated in the opening 18c of the clad layer 18. In the present embodiment, in particular, the plasmon generator 16 is accommodated in the opening 18c of the clad layer 18 and the opening of the mask layer 51. The dielectric film 52 is provided in the opening 18c of the clad layer 18 and the opening of the mask layer 51 so as to be interposed between the plasmon generator 16 and each of the waveguide 14, the clad layer 18 and the mask layer 51. The dielectric film 52 is made of a dielectric material that has a refractive index lower than that of the waveguide 14. The dielectric film 52 may be made of the same material as, the clad layers 12, 15 and 18.

The plasmon generator 16 is made of a metal. Specifically, the plasmon generator 16 is made of one of Au, Ag, Al, Cu, Pd, Pt, Rh and Ir, or of an alloy composed of two or more of these elements. The plasmon generator 16 and the mask layer 51 have top surfaces even with each other. The shape of the plasmon generator 16 will be described in detail later.

The thermally-assisted magnetic recording head further includes an insulating layer 19 formed over the top surfaces of the plasmon generator 16 and the mask layer 51, and a magnetic pole 22 disposed on the insulating layer 19. The insulating layer 19 is made of alumina, for example. The magnetic pole 22 includes a first layer 22A located on the insulating layer 19 and a second layer 22B located on the first layer 22A.

The thermally-assisted magnetic recording head further includes: a coupling layer 21 that is made of a magnetic material and disposed at a position on the insulating layer 19 farther from the medium facing surface 40 than the magnetic pole 22; and an insulating layer 23 disposed around the first layer 22A of the magnetic pole 22 and the coupling layer 21 on the insulating layer 19. The insulating layer 23 is made of alumina, for example. The coupling layer 21 is magnetically coupled to the return magnetic pole layer 10 via two coupling portions to be described later.

The thermally-assisted magnetic recording head further includes a coupling layer 24 made of a magnetic material and disposed on the coupling layer 21, and an insulating layer 25 disposed around the second layer 22B of the magnetic pole 22 and the coupling layer 24 on the insulating layer 23. The insulating layer 25 is made of alumina, for example.

The thermally-assisted magnetic recording head further includes a coupling layer 26 made of a magnetic material and disposed on the second layer 22B of the magnetic pole 22, and a coupling layer 27 made of a magnetic material and disposed on the coupling layer 24.

The thermally-assisted magnetic recording head further includes: an insulating layer 28 disposed on the insulating layer 25; a plurality of first coil elements 30A disposed on the insulating layer 28; and an insulating layer 31 disposed around the coupling layers 26 and 27 and the first coil elements 30A. FIG. 5 shows the first coil elements 30A. The first coil elements 30A are arranged to align in the Y direction. Each of the first coil elements 30A has a main part that extends in the track width direction (X direction). Each of the first coil elements 30A is made of a conductive material such as copper. The insulating layers 28 and 31 are made of alumina, for example.

The thermally-assisted magnetic recording head further includes an insulating layer 32 disposed to cover the first coil elements 30A, and a yoke layer 33 made of a magnetic material and disposed over the coupling layers 26 and 27 and the insulating layer 32. The yoke layer 33 magnetically couples the coupling layer 26 to the coupling layer 27. The insulating layer 32 is made of alumina, for example.

The thermally-assisted magnetic recording head further includes: an insulating layer 34 disposed to cover the yoke layer 33; a plurality of second coil elements 30B disposed on the insulating layer 34; a lead layer 30C disposed on the insulating layer 34; and a protection layer 35 disposed to cover the second coil elements 30B and the lead layer 30C. The insulating layer 34 and the protection layer 35 are made of alumina, for example.

FIG. 6 shows the second coil elements 30B and the lead layer 30C. The second coil elements 30B are arranged to align in the Y direction. Each of the second coil elements 30B has a main part that extends in the track width direction (X direction). Each of the second coil elements 30B and the lead layer 30C are made of a conductive material such as copper.

As shown in FIG. 5 and FIG. 6, the thermally-assisted magnetic recording head further includes a plurality of connecting portions 36 and a connecting portion 37. The plurality of connecting portions 36 connect the plurality of first coil elements 30A to the plurality of second coil elements 30B so as to form a coil 30 wound around the yoke layer 33 helically. The connecting portion 37 connects one of the first coil elements 30A to the lead layer 30C. The connecting portions 36 and the connecting portion 37 are provided to penetrate through the insulating layers 32 and 34. The connecting portions 36 and the connecting portion 37 are each made of a conductive material such as copper.

FIG. 5 further shows two coupling portions 29A and 29B that couple the coupling layer 21 to the return magnetic pole layer 10. The coupling portions 29A and 29B are provided to penetrate through the clad layers 12, and 18 and the insulating layer 19. The coupling portions 29A and 29B are disposed on opposite sides of the waveguide 14 in the track width direction (X direction), each being spaced from the waveguide 14. Although not shown, each of the coupling portions 29A and 29B includes a first layer located on the return magnetic pole layer 10, and a second layer and a third layer arranged in this order on the first layer.

The parts from the return magnetic pole layer 10 to the second coil elements 30B constitute a write head. The coil 30, which is composed of the first coil elements 30A, the second coil elements 30B and the connecting portions 36, produces a magnetic field corresponding to data to be written on the recording medium. The return magnetic pole layer 10, the coupling portions 29A and 29B, the coupling layers 21, 24 and 27, the yoke layer 33, the coupling layer 26, and the magnetic pole 22 form a magnetic path for passing a magnetic flux corresponding to the magnetic field produced by the coil 30. The magnetic pole 22 allows the magnetic flux corresponding to the magnetic field produced by the coil 30 to pass, and produces a write magnetic field for writing data on the recording medium by means of a perpendicular magnetic recording system.

As has been described, the thermally-assisted magnetic recording head according to the present embodiment includes the medium facing surface 40 facing the recording medium, and the read head and the write head. The read head and the write head are stacked on the substrate 1. Relative to the read head, the write head is located on the front side (trailing side) in the direction of travel of the recording medium (Z direction).

The read head includes: the MR element 5 as the read element; the bottom shield layer 3 and the top shield layer 7 for shielding the MR element 5, the bottom shield layer 3 and the top shield layer 7 having their respective portions that are located near the medium facing surface 40 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head includes the coil 30, the magnetic pole 22, the waveguide 14, the clad layers 12, 15 and 18, the plasmon generator 16, and the dielectric film 52. The coil 30 produces a magnetic field corresponding to data to be written on the recording medium. The magnetic pole 22 allows the magnetic flux corresponding to the magnetic field produced by the coil 30 to pass, and produces a write magnetic field for writing data on the recording medium by means of the perpendicular magnetic recording system.

A near-field light generator according to the present embodiment includes the waveguide 14, the clad layer 18, the plasmon generator 16, and the dielectric film 52. The waveguide 14 has the top surface 14a, and propagates the laser light emitted from the not-shown laser diode. The clad layer 18 has the bottom surface 18a in contact with the top surface 14a of the waveguide 14, the top surface 18b opposite to the bottom surface, and the opening 18c penetrating from the top surface 18b to the bottom surface 18a. The opening 18c has the first opening sidewall 18c1 and the second opening sidewall 18c2 that decrease in distance from each other with decreasing distance to the top surface 14a of the waveguide 14. At least part of the plasmon generator 16 is accommodated in the opening 18c. The dielectric film 52 is provided in the opening 18c so as to be interposed between the plasmon generator 16 and each of the waveguide 14 and the clad layer 18.

The shape of the plasmon generator 16 will now be described in detail with reference to FIG. 1 and FIG. 2. As shown in FIG. 1 and FIG. 2, the plasmon generator 16 is generally triangular-prism-shaped. Specifically, the plasmon generator 16 has a front end face 16a located in the medium facing surface 40, a rear end face 16b opposite to the front end face, first and second inclined surfaces 16c1 and 16c2, and a top surface 16d. The first inclined surface 16c1 is opposed to the first opening sidewall 18c1 with the dielectric film 52 interposed therebetween. The second inclined surface 16c2 is opposed to the second opening sidewall 18c2 with the dielectric film 52 interposed therebetween. The top surface 16d connects the first and second inclined surfaces 16c1 and 16c2 to each other.

The plasmon generator 16 further has an edge part 16e that connects the first and second inclined surfaces 16c1 and 16c2 to each other, and a near-field light generating part 16f that is located in the medium facing surface 40 and generates near-field light. The near-field light generating part 16f lies at an end of the edge part 16e. The first and second inclined surfaces 16c1 and 16c2 decrease in distance from each other with decreasing distance to the edge part 16e. The edge part 16e faces the top surface 14a of the waveguide 14 with a predetermined distance provided therebetween by the thickness of the dielectric film 52, and extends in the direction perpendicular to the medium facing surface 40 (Y direction). In a cross section parallel to the medium facing surface 40, the edge part 16e may have the shape of a perfectly pointed edge whereas it may have an arc shape in a microscopic view.

As shown in FIG. 2, each of the first and second inclined surfaces 16c1 and 16c2 is inclined with respect to a virtual plane P parallel to the top surface 14a of the waveguide 14. The angle that the first inclined surface 16c1 forms with respect to the virtual plane P is equal to the angle that the second inclined surface 16c2 forms with respect to the virtual plane P. The angle will hereinafter be represented by $\theta 1$. The angle $\theta 1$ falls within the range of 30 to 60 degrees, for example. In one example, the angle $\theta 1$ is 45 degrees.

The front end face 16a has a first side 16a1 that lies at an end of the first inclined surface 16c1, a second side 16a2 that lies at an end of the second inclined surface 16c2, a third side 16a3 that lies at an end of the top surface 16d, and a tip 16a4 that is formed by contact of the first side 16a1 and the second side 16a2 with each other and forms the near-field light generating part 16f. The tip 16a4 may have the shape of a perfectly pointed edge whereas it may have an arc shape in a microscopic view.

Each of the first side 16a1 and the second side 16a2 is inclined with respect to the foregoing virtual plane P. The angle that the first side 16a1 forms with respect to the virtual plane P is equal to the angle $\theta 1$ that the first inclined surface 16c1 forms with respect to the virtual plane P. The angle that the second side 16a2 forms with respect to the virtual plane P is equal to the angle $\theta 1$ that the second inclined surface 16c2 forms with respect to the virtual plane P.

Here, the length of the plasmon generator 16 in the direction perpendicular to the medium facing surface 40 (Y direction) will be denoted by the symbol $H_{PG}$; the length of the side 16a3 will be denoted by the symbol $W_{PG}$; and the length of the front end face 16a in the direction perpendicular to the top surface 16d (Z direction) will be denoted by the symbol $T_{PG}$. $H_{PG}$ is greater than $T_{PG}$. Both of $W_{PG}$ and $T_{PG}$ are smaller than or equal to the wavelength of the light that is propagated through the waveguide 14. $W_{PG}$ falls within the range of 100 to 500 nm, for example. $T_{PG}$ falls within the range of 100 to 500 nm, for example. $H_{PG}$ falls within the range of 0.25 to 2.5 μm, for example. The distance between the edge part 16e and the top surface 14a of the waveguide 14 will be denoted by the symbol D. D falls within the range of 10 to 50 nm, for example.

Now, the principle of generation of near-field light in the present embodiment and the principle of thermally-assisted magnetic recording using the near-field light will be described in detail. The laser light emitted from the not-shown laser diode enters the waveguide 14. As shown in FIG. 3, the laser light 50 is propagated through the waveguide 14 toward the medium facing surface 40, and reaches the vicinity of the plasmon generator 16. The laser light 50 is then totally reflected at the top surface 14a of the waveguide 14. This generates evanescent light permeating into the clad layer 18 and into the dielectric film 52. As a result, the evanescent light and the collective oscillations of charges on the edge part 16e and its vicinity in the plasmon generator 16, i.e., surface plasmons, are coupled with each other to excite a system of surface plasmon polaritons. In this way, surface plasmons are excited on the edge part 16e and its vicinity in the plasmon generator 16.

The surface plasmons excited on the plasmon generator 16 are propagated along the edge part 16e to the near-field light generating part 16f. Consequently, the surface plasmons concentrate at the near-field light generating part 16f, and the near-field light generating part 16f generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the magnetic pole 22 for data writing.

Now, with reference to FIG. 3 and FIG. 4, a description will be given of a method of manufacturing the thermally-assisted magnetic recording head according to the present embodiment. The method of manufacturing the thermally-assisted magnetic recording head according to the present embodiment includes the steps of: forming components of a plurality of thermally-assisted magnetic recording heads other than the substrates 1 on a substrate that includes portions to become the substrates 1 of the plurality of thermally-assisted magnetic recording heads, thereby fabricating a substructure that includes a plurality of rows of pre-head portions, the pre-head portions being intended to become the thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the surfaces formed by cutting are polished into the medium facing surfaces 40.

The method of manufacturing the thermally-assisted magnetic recording head according to the present embodiment will now be described in more detail with attention focused on a single thermally-assisted magnetic recording head. In the method of manufacturing the thermally-assisted magnetic recording head according to the present embodiment, the insulating layer 2 is initially formed on the substrate 1. Next, the bottom shield layer 3 is formed on the insulating layer 2. Next, the bottom shield gap film 4 is formed on the bottom shield layer 3. Next, the MR element 5 and the not-shown two leads connected to the MR element 5 are formed on the bottom shield gap film 4. Next, the top shield gap film 6 is formed to cover the MR element 5 and the leads. Next, the top shield layer 7 is formed on the top shield gap film 6. Next, the nonmagnetic layer 8 is formed on the top shield layer 7. Next, the return magnetic pole layer 10 is formed on the nonmagnetic layer 8.

Next, the respective first layers of the coupling portions 29A and 29B are formed on the return magnetic pole layer 10. Next, the clad layer 12 is formed to cover the respective first layers of the coupling portions 29A and 29B. The clad layer 12 is then polished by, for example, chemical mechanical polishing (hereinafter referred to as CMP), until the respective first layers of the coupling portions 29A and 29B are exposed. The top surfaces of the first layers of the coupling portions 29A and 29B and the top surface of the insulating layer 12 are thereby made even with each other.

Next, the waveguide 14 is formed on the clad layer 12. The respective second layers of the coupling portions 29A and 29B are also formed on the respective first layers of the coupling portions 29A and 29B. Next, the clad layer 15 is formed to cover the respective second layers of the coupling portions 29A and 29B. The clad layer 15 is then polished by, for example, CMP, until the respective second layers of the coupling portions 29A and 29B are exposed.

Next, the clad layer 18 and the mask layer 51 are formed on top of the waveguide 14 and the clad layer 15. The clad layer 18 is provided with the opening 18c, and two openings for passing the coupling portions 29A and 29B. The mask layer 51 is provided with an opening having a shape corresponding to the planar shape of the plasmon generator 16, and two openings having shapes corresponding to the respective planar shapes of the coupling portions 29A and 29B. Next, the dielectric film 52 and the plasmon generator 16 are formed in the opening 18c of the clad layer 18. The respective third layers of the coupling portions 29A and 29B are also formed on the respective second layers of the coupling portions 29A and 29B. The method of manufacturing the near-field light generator according to the present embodiment including the wave guide 14, the clad layer 18, the plasmon generator 16, and the dielectric film 52 will be described in detail later.

Next, the insulating layer 19 is formed over the plasmon generator 16 and the mask layer 51. The insulating layer 19 is provided with two openings for exposing the top surfaces of the respective third layers of the coupling portions 29A and 29B. Next, the first layer 22A of the magnetic pole 22 is formed on the insulating layer 19. At the same time, the coupling layer 21 is formed to be coupled to the coupling portions 29A and 29B. Next, the insulating layer 23 is formed to cover the first layer 22A and the coupling layer 21. The insulating layer 23 is then polished by, for example, CMP, until the first layer 22A and the coupling layer 21 are exposed.

Next, the second layer 22B of the magnetic pole 22 is formed on the first layer 22A. At the same time, the coupling layer 24 is formed on the coupling layer 21. Next, the insulating layer 25 is formed to cover the second layer 22B and the coupling layer 24. The insulating layer 25 is then polished by, for example, CMP, until the second layer 22B and the coupling layer 24 are exposed.

Next, the insulating layer 28 is formed on the insulating layer 25. Next, the first coil elements 30A are formed on the insulating layer 28. The coupling layer 26 is formed on the second layer 22B of the magnetic pole 22, and the coupling layer 27 is formed on the coupling layer 24. Next, the insulating layer 31 is formed to cover the first coil elements 30A and the coupling layers 26 and 27. The insulating layer 31 is then polished by, for example, CMP, until the first coil elements 30A and the coupling layers 26 and 27 are exposed.

Next, the insulating layer 32 is formed to cover the first coil elements 30A. The insulating layer 32 is provided with a plurality of openings for passing the connecting portions 36 and 37. Next, the connecting portions 36 and 37 are formed to be connected to the first coil elements 30A through the plurality of openings. Next, the yoke layer 33 is formed over the coupling layers 26 and 27 and the insulating layer 32. Next, the insulating layer 34 is formed to cover the yoke layer 33 and the connecting portions 36 and 37. The insulating layer 34 is then polished by, for example, CMP, until the connecting portions 36 and 37 are exposed.

Next, the second coil elements 30B and the lead layer 30C are formed on the connecting portions 36 and 37 and the insulating layer 34. Next, the protection layer 35 is formed to cover the second coil elements 30B and the lead layer 30C. Wiring, terminals, and other components are then formed on the top surface of the protection layer 35.

When the substructure is completed thus, the substructure is cut to separate the plurality of pre-head portions from each other, followed by the polishing of the medium facing surface 40 and the fabrication of flying rails etc. This completes the thermally-assisted magnetic recording head.

The method of manufacturing the near-field light generator according to the present embodiment will now be described in detail with reference to FIG. 7 to FIG. 13. FIG. 7 to FIG. 13 each show a cross section of a stack of layers in the process of forming the near-field light generator, the cross section being taken in the position where the medium facing surface 40 is to be formed.

Figure 7:
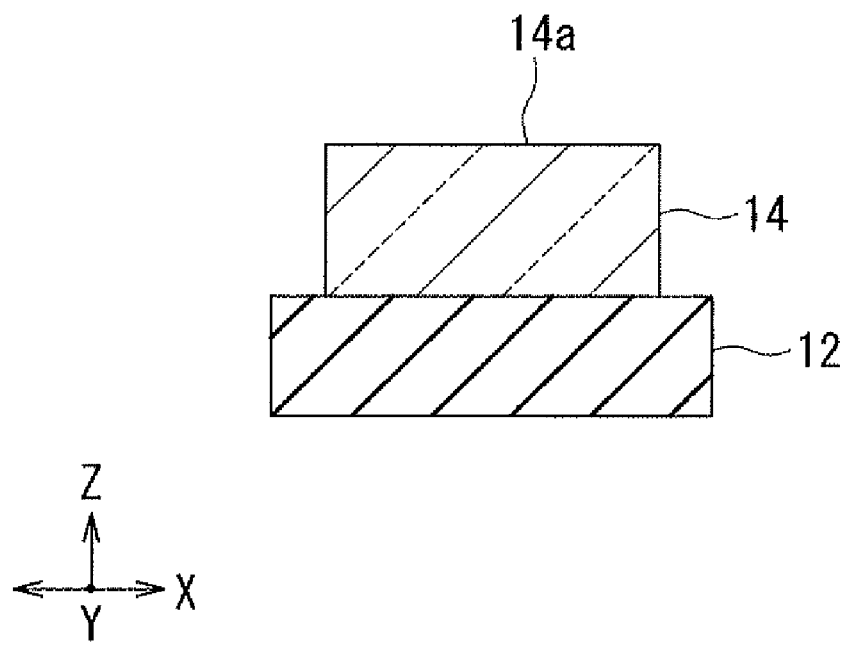
FIG. 7 is a cross-sectional view showing a step of a method of manufacturing a near-field light generator according to the first embodiment of the invention.

FIG. 7 shows a step that follows the formation of the clad layer 12. In this step, a dielectric layer is initially formed on the clad layer 12. The dielectric layer is to be etched later to become the waveguide 14. Next, a photoresist mask is formed on the dielectric layer. The photoresist mask is formed by patterning a photoresist layer by photolithography. Next, the dielectric layer is etched by, for example, reactive ion etching (hereinafter referred to as RIE), using the photoresist mask as the etching mask, so that the dielectric layer becomes the waveguide 14. If the dielectric layer is made of tantalum oxide, a gas containing $CF_4$ or a gas containing $Cl_2$ and $BCl_3$ is used as the etching gas when etching the dielectric layer by RIE. Next, the photoresist mask is removed.

Figure 8:
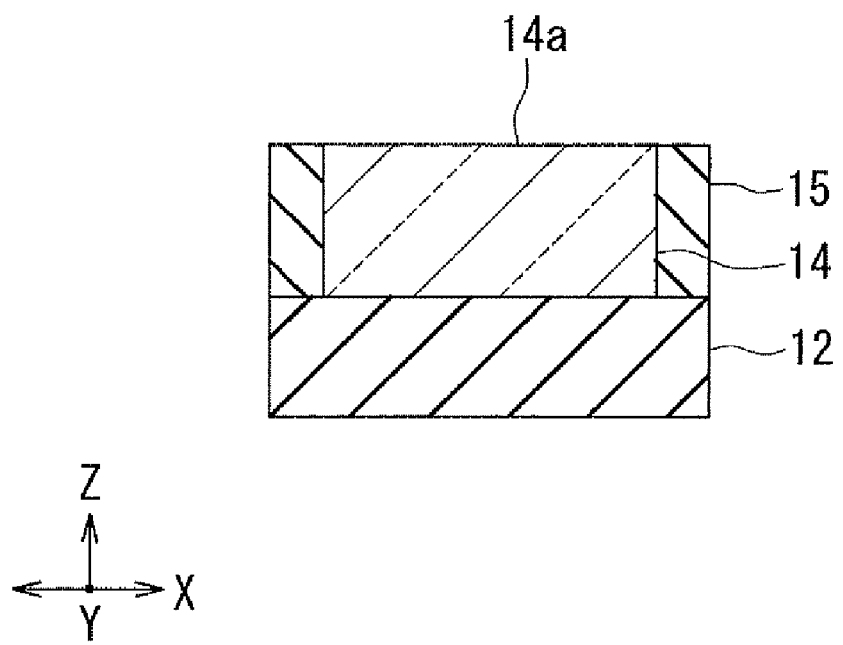
FIG. 8 is a cross-sectional view showing a step that follows the step of FIG. 7.

FIG. 8 shows the next step. In this step, the clad layer 15 is initially formed to cover the waveguide 14. The clad layer 15 is then polished by, for example, CMP, until the top surface 14a of the waveguide 14 is exposed.

Figure 9:
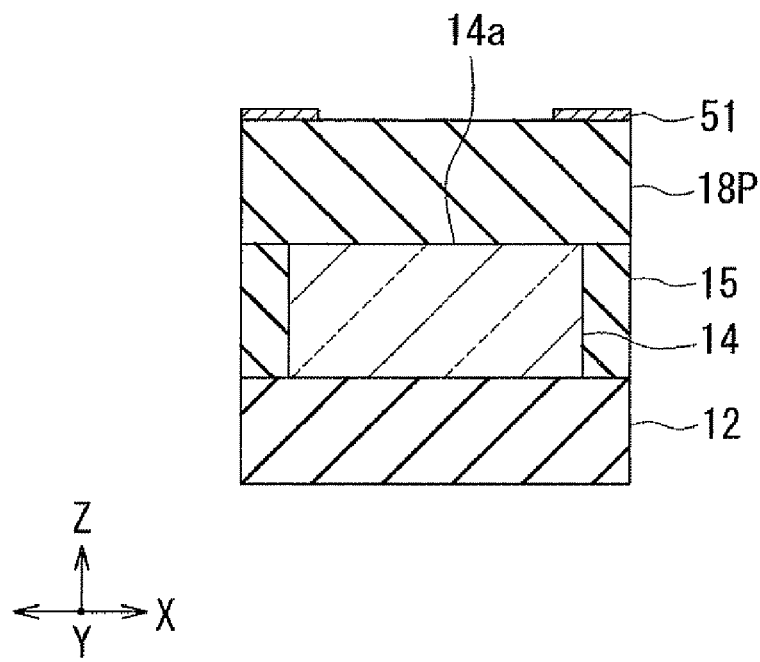
FIG. 9 is a cross-sectional view showing a step that follows the step of FIG. 8.

FIG. 9 shows the next step. In this step, an initial clad layer 18P is initially formed over the waveguide 14 and the clad layer 15. The initial clad layer 18P is intended to undergo the formation of the opening 18c therein later to thereby become the clad layer 18. The initial clad layer 18P is formed into a thickness equal to or slightly greater than the length $T_{PG}$ of the front end face 16a (see FIG. 1 and FIG. 2) in the direction perpendicular to the top surface 16d of the plasmon generator 16 (Z direction) to be formed later. The difference between the thickness of the initial clad layer 18P and the length $T_{PG}$ is 0 to 20 nm, for example. Next, the mask layer 51 is formed on the initial clad layer 18P. The mask layer 51 has a penetrating opening that has a shape corresponding to the planar shape of the plasmon generator 16 to be formed later. The mask layer 51 is formed mainly of a photoresist or a metal material. The mask layer 51 may include an underlayer made of Ta, Ti, or silicon dioxide, and a photoresist layer formed thereon.

Figure 10:
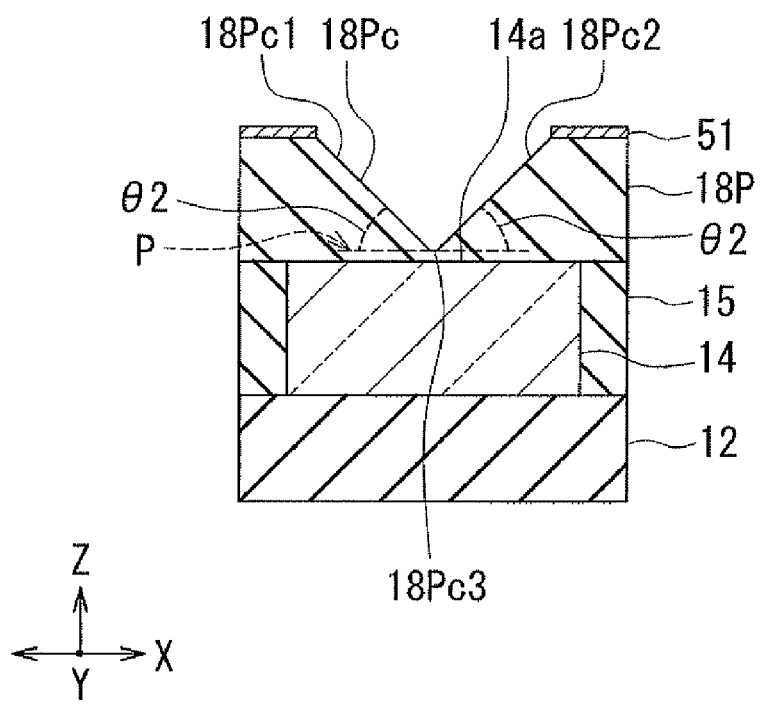
FIG. 10 is a cross-sectional view showing a step that follows the step of FIG. 9.

FIG. 10 shows the next step. In this step, the initial clad layer 18P is taper-etched by, for example, RIE, using the mask layer 51 as the etching mask. As a result, a recess 18Pc that does not reach the top surface 14a of the waveguide 14 is formed in the initial clad layer 18P. The recess 18Pc includes first and second sidewalls 18Pc1 and 18Pc2, and a bottom end part 18Pc3. The first and second sidewalls 18Pc1 and 18Pc2 decrease in distance from each other with decreasing distance to the top surface 14a of the waveguide 14. The bottom end part 18Pc3 connects the sidewalls 18Pc1 and 18Pc2 to each other. The bottom end part 18Pc3 lies above the top surface 14a of the waveguide 14. The first and second sidewalls 18Pc1 and 18Pc2 are both inclined with respect to a virtual plane P that is parallel to the top surface 14a of the waveguide 14. If the initial clad layer 18P is made of alumina, the taper-etching of the initial clad layer 18P is effected by RIE using an etching gas that contains $Cl_2$ and $BCl_3$, and at least one of $N_2$ and $CF_4$, for example. $Cl_2$ and $BCl_3$ are the main components that contribute to the etching of the initial clad layer 18P. $N_2$ and $CF_4$ are gases for forming a sidewall-protecting film on the sidewalls of the etched groove while the etching of the initial clad layer 18P is in process. Using the etching gas containing at least one of $N_2$ and $CF_4$ results in the formation of the sidewall-protecting film on the sidewalls of the groove during the etching of the initial clad layer 18P. Consequently, the first and second sidewalls 18Pc1 and 18Pc2 are formed as surfaces inclined with respect to the foregoing virtual plane P.

The angle that the first sidewall 18Pc1 forms with respect to the virtual plane P is equal to the angle that the second sidewall 18Pc2 forms with respect to the virtual plane P. The angle will hereinafter be represented by the symbol θ2. The angle θ2 can be controlled within the range of, for example, 30 degrees to 60 degrees by changing the ratio of the flow rate of the at least one of $N_2$ and $CF_4$ to the total flow rate of the etching gas. In one example, the angle θ2 is 45 degrees.

Now, an example will be given of the conditions for the taper-etching of the initial clad layer 18P other than the etching gas. This example employs an RIE system that uses a high frequency coil to produce plasma in a chamber by electromagnetic induction. The source power to be supplied to the high frequency coil is 1200 W, the high frequency bias power is 25 W, and the chamber pressure is 0.3 Pa.

Figure 11:
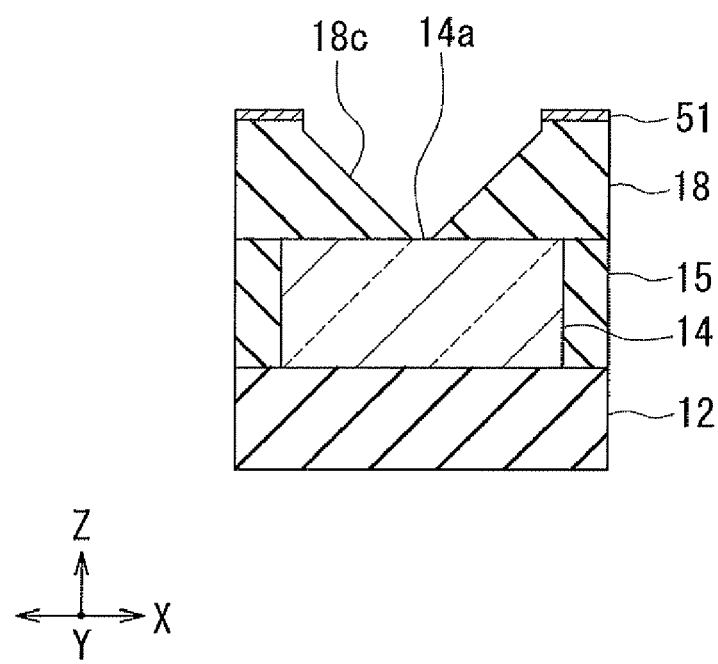
FIG. 11 is a cross-sectional view showing a step that follows the step of FIG. 10.

FIG. 11 shows the next step. In this step, the recess 18Pc is etched by wet etching. Here, the recess 18Pc is etched in the direction of the depth (Z direction). The etching is performed until the recess 18Pc reaches the top surface 14a of the waveguide 14 so that the top surface 14a of the waveguide 14 is exposed in part. As a result, the recess 18Pc becomes the opening 18c, and the initial clad layer 18P becomes the clad layer 18.

The step of etching the recess 18Pc is performed under such a condition that the etching stops at the top surface 14a of the waveguide 14. For example, if the waveguide 14 is made of tantalum oxide and the initial clad layer 18P is made of alumina, the wet etching uses an etchant that contains tetramethyl ammonium hydroxide (TMAH) or KOH at a concentration of 2.38%. Using such an etchant can etch the initial clad layer 18P alone, with the waveguide 14 non-etched.

Figure 12:
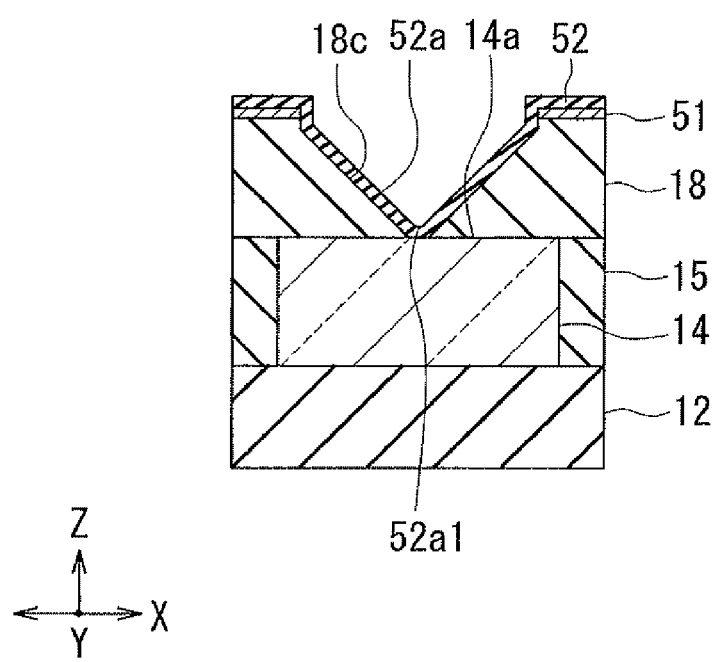
FIG. 12 is a cross-sectional view showing a step that follows the step of FIG. 11.

FIG. 12 shows the next step. In this step, the dielectric film 52 is formed at least in the opening 18c of the clad layer 18 and the opening of the mask layer 51 by atomic layer deposition (hereinafter referred to as ALD), for example. The dielectric film 52 is formed also on the top surface 14a of the waveguide 14 that is exposed in the bottom of the opening 18c. The stack after the formation of the dielectric film 52 has a recess 52a for accommodating the plasmon generator 16 to be formed later. The recess has a bottom end 52a1 at a level higher than the top surface 14a of the waveguide 14.

Figure 13:
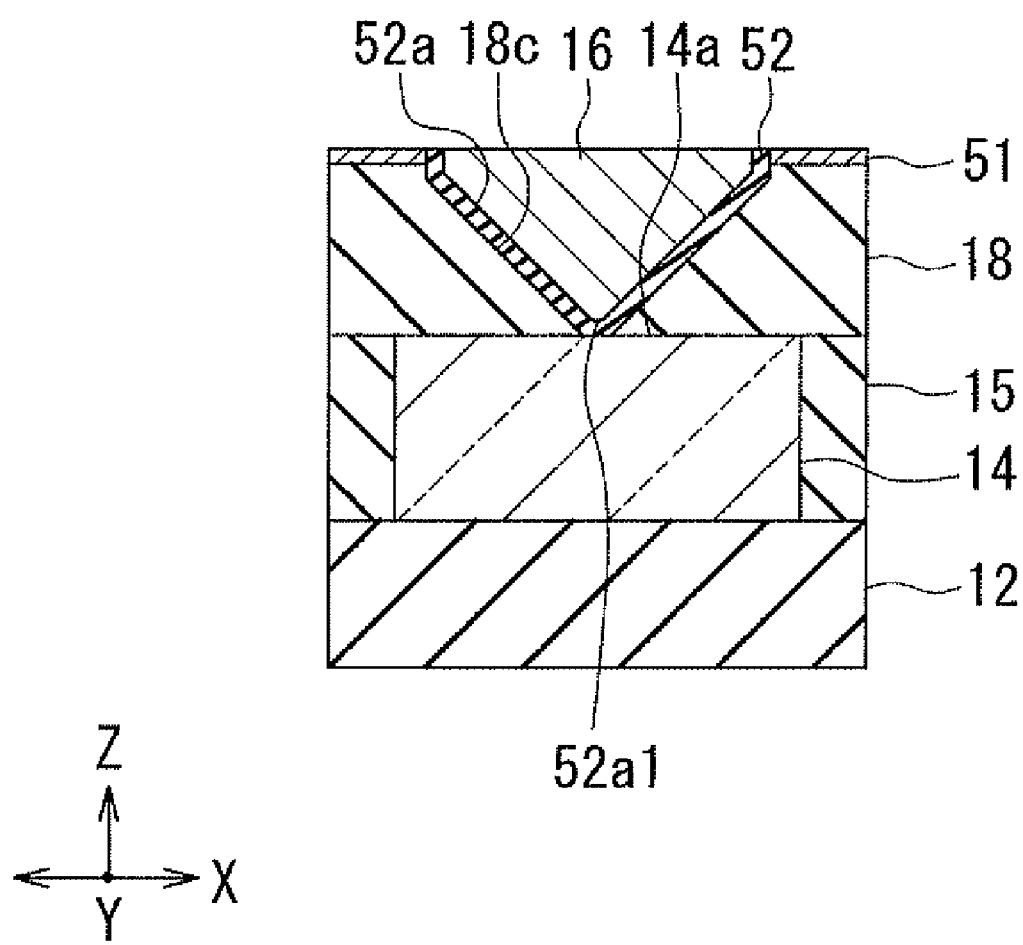
FIG. 13 is a cross-sectional view showing a step that follows the step of FIG. 12.

FIG. 13 shows the next step. In this step, a metal layer that is to become the plasmon generator 16 later is initially formed on the dielectric film 52 by sputtering, for example. The metal layer is formed into a thickness sufficient for at least filling the recess 52a. Next, the dielectric film 52 and the metal layer are polished by, for example, CMP, until the mask layer 51 is exposed. The remaining metal layer thereby becomes the plasmon generator 16.

As described above, in the near-field light generator according to the present embodiment, the edge part 16e of the plasmon generator 16 faces the top surface 14a of the waveguide 14 with a predetermined distance provided therebetween by the thickness of the dielectric film 52. Surface plasmons are thus excited on the edge part 16e through coupling with the evanescent light that occurs at the top surface 14a of the waveguide 14 based on the laser light propagated through the waveguide 14. The surface plasmons are propagated along the edge part 16 to the near-field light generating part 16f. The near-field light generating part 16f generates near-field light based on the surface plasmons. According to the present embodiment, it is possible to increase the efficiency of transformation of the light propagated through the waveguide 14 into the near-field light, as compared with the conventional case where a plasmon antenna is directly irradiated with laser light to produce near-field light.

According to the present embodiment, it is possible suppress a temperature rise of the plasmon generator 16 because the plasmon generator 16 is not directly irradiated with the laser light propagated through the waveguide 14. In the present embodiment, the length $H_{PG}$ of the plasmon generator 16 in the direction perpendicular to the medium facing surface 40 is greater than the length $T_{PG}$ of the front end face 16a in the direction perpendicular to the top surface 16d of the plasmon generator 16. Thus, the plasmon generator 16 of the present embodiment is greater in volume than a conventional plasmon antenna in which the length in the direction perpendicular to the medium facing surface 40 is smaller than the length in the direction perpendicular to the top surface 1a of the substrate 1. This also contributes to suppression of a temperature rise of the plasmon generator 16. Consequently, according to the present embodiment, it is possible to prevent the plasmon generator 16 from protruding from the medium facing surface 40.

In the method of manufacturing the near-field light generator according to the present embodiment, the formation of the waveguide 14 is followed by the formation of the initial clad layer 18P on the wave guide 14. The initial clad layer 18P is to undergo the formation of the opening 18c therein later to thereby become the clad layer 18. Next, the initial clad layer 18P is etched by RIE so that the recess 18Pc that does not reach the top surface 14a of the waveguide 14 is formed in the initial clad layer 18P. Next, the recess 18Pc is etched by wet etching until the top surface 14a of the waveguide 14 is exposed in part, so that the recess 18Pc becomes the opening 18c and the initial clad layer 18P becomes the clad layer 18. Next, the dielectric film 52 is formed in the opening 18c. Next, the plasmon generator 16 is formed on the dielectric film 52.

According to the present embodiment, as described above, the step of etching the recess 18Pc of the initial clad layer 18P by wet etching forms the opening 18c so that the top surface 14a of the waveguide 14 is exposed in part. Subsequently, the dielectric film 52 is formed in the opening 18c, and the plasmon generator 16 is formed on the dielectric film 52. The distance D between the outer surface (top surface 14a) of the waveguide 14 and the edge part 16e of the plasmon generator 16 is thus determined by the thickness of the dielectric film 52. Consequently, according to the present embodiment, it is possible to reduce variations in the distance D between the outer surface (top surface 14a) of the waveguide 14 and the edge part 16e of the plasmon generator 16. Variations in the distance D lead to variations in the intensity of the surface plasmons excited on the plasmon generator 16, and consequently lead to variations in the intensity of the near-field light generated by the plasmon generator 16. Variations in the distance D therefore need to be reduced. In particular, variations smaller than 10 nm are preferred.

Now, consider a case where the dielectric film 52 and the plasmon generator 16 are formed without etching the recess 18Pc of the initial clad layer 18P by wet etching. In such a case, the bottom end part 18Pc3 of the recess 18Pc lies above the top surface 14a of the waveguide 14, with the clad layer 18 and the dielectric film 52 interposed between the edge part 16e of the plasmon generator 16 and the top surface 14a of the waveguide 14. In the case of forming the recess 18Pc by RIE, the recess 18Pc can vary in depth by 10 to 30 nm or so. Here, variations in the distance between the outer surface (top surface 14a) of the waveguide 14 and the edge part 16e of the plasmon generator 16 are at least 10 to 30 nm or so, and cannot be smaller than 10 nm.

In contrast, according to the present embodiment, the distance D between the outer surface (top surface 14a) of the waveguide 14 and the edge part 16e of the plasmon generator 16 is determined by the thickness of the dielectric film 52 as previously mentioned. Variations in the thickness of the dielectric film 52 can be made smaller than variations in the depth of the recess 18Pc. If the dielectric film 52 is formed by ALD, in particular, it is possible to make the thickness variations of the dielectric film 52 even smaller. More specifically, if the dielectric film 52 is formed by ALD, the thickness variations of the dielectric film 52 can be suppressed to 5% or less the thickness of the dielectric film 52. In such a case, if the dielectric film 52 has a thickness of 50 nm or less, the thickness variations of the dielectric film 52 can be 2.5 nm or less. This can suppress variations in the distance D between the edge part 16e and the top surface 14a of the waveguide 14 to or below 2.5 nm.

The present embodiment employs wet etching to etch the recess 18Pc. This facilitates selecting such a condition that the etching stops at the top surface 14a of the waveguide 14.

It should be noted that the top surface 14a of the waveguide 14 will be damaged if the recess 18Pc is etched not by wet etching but by dry etching. In contrast, the present embodiment employs wet etching to etch the recess 18Pc. This makes it possible to prevent the top surface 14a of the waveguide 14 from being damaged.

Second Embodiment

Figure 14:
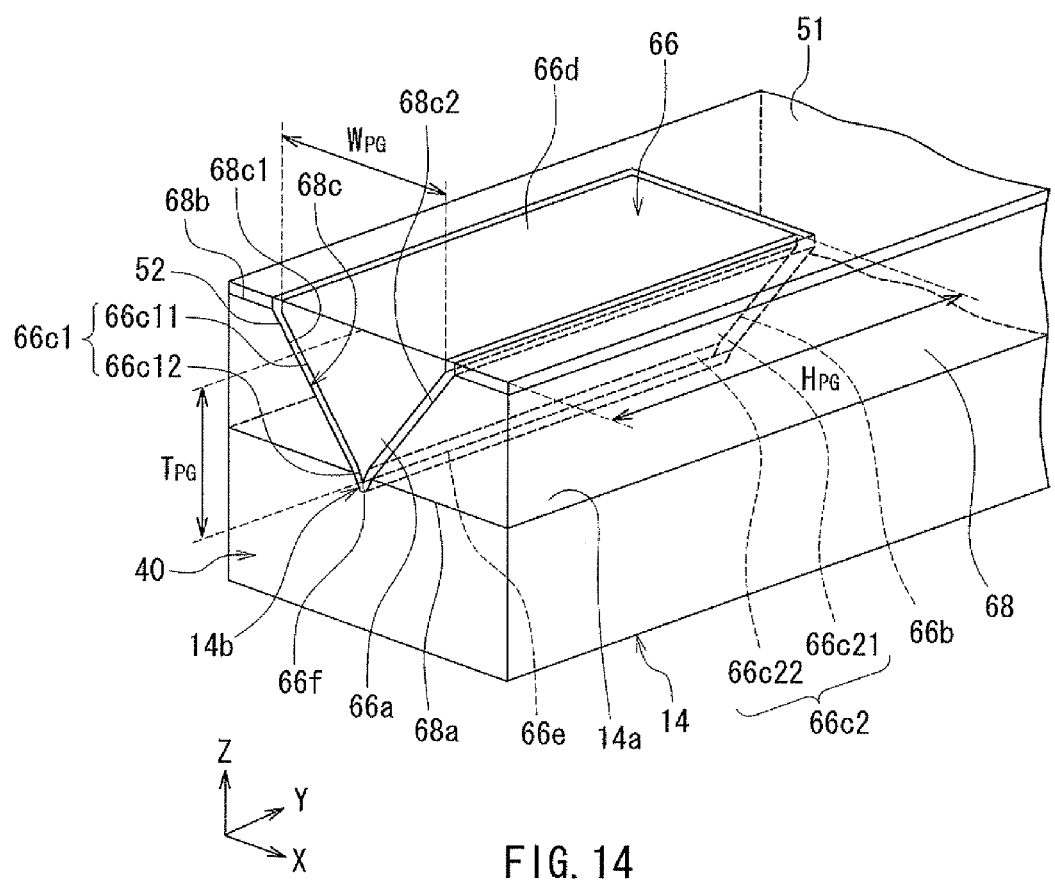
FIG. 14 is a perspective view showing the main part of a thermally-assisted magnetic recording head according to a second embodiment of the invention.
Figure 15:
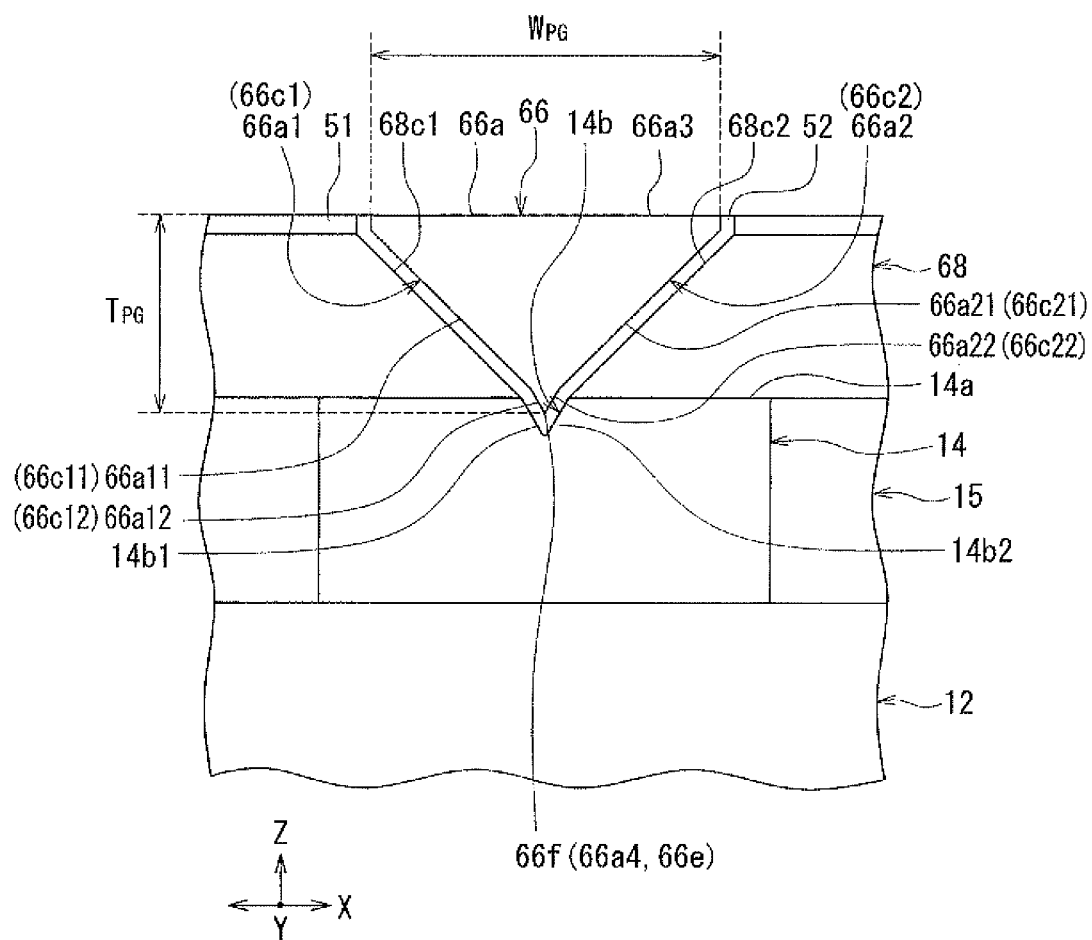
FIG. 15 is a front view showing a part of the medium facing surface of the thermally-assisted magnetic recording head according to the second embodiment of the invention.
Figure 16:
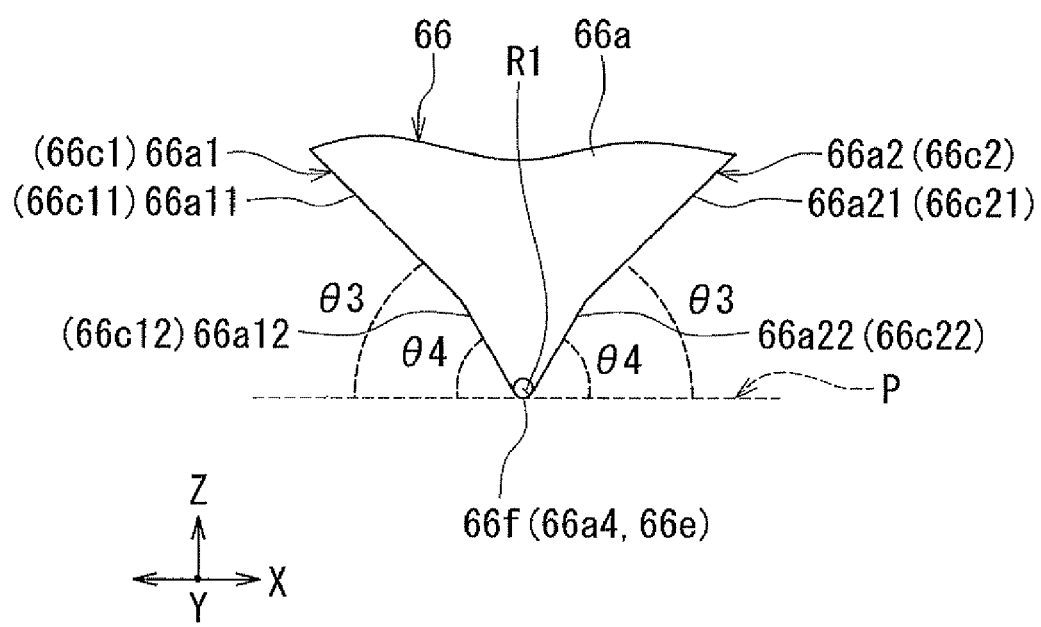
FIG. 16 is a magnified partial front view of the plasmon generator shown in FIG. 15.

A thermally-assisted magnetic recording head according to a second embodiment of the invention will now be described with reference to FIG. 14 to FIG. 16. FIG. 14 is a perspective view showing the main part of the thermally-assisted magnetic recording head according to the present embodiment. FIG. 15 is a front view showing a part of the medium facing surface of the thermally-assisted magnetic recording head according to the present embodiment. FIG. 16 is a magnified partial front view of the plasmon generator shown in FIG. 15.

The thermally-assisted magnetic recording head according to the present embodiment has a plasmon generator 66 and a clad layer 68 instead of the plasmon generator 16 and the clad layer 18 of the first embodiment. The near-field light generator according to the present embodiment has the waveguide 14, the clad layer 68, the plasmon generator 66, and the dielectric film 52. The plasmon generator 66 is made of the same material as that of the plasmon generator 16. The clad layer 68 is made of the same material as that of the clad layer 18. The waveguide 14 of the present embodiment has a groove 14b that is opened in the top surface 14a and is oblong in the direction that is parallel to the top surface 14a and perpendicular to the medium facing surface 40 (Y direction).

The clad layer 68 has a bottom surface 68a in contact with the top surface 14a of the waveguide 14, a top surface 68b opposite to the bottom surface, and an opening 68c that penetrates from the top surface 68b to the bottom surface 68a and is continuous with the groove 14b. The opening 68c has a first opening sidewall 68c1 and a second opening sidewall 68c2 that decrease in distance from each other with decreasing distance to the top surface 14a of the waveguide 14. The edge of the opening 68c in the bottom surface 68a is located directly above the edge of the groove 14b in the top surface 14a of the waveguide 14. The edge of the opening of the mask layer 51 of the present embodiment is located directly above the edge of the opening 68c in the top surface 68b of the clad layer 68.

As shown in FIG. 15, the groove 14b of the waveguide 14 has a first groove sidewall 14b1 that is continuous with the first opening sidewall 68c, and a second groove sidewall 14b2 that is continuous with the second opening sidewall 68c2. The first and second groove sidewalls 14b1 and 14b2 decrease in distance from each other with increasing distance from the top surface 14a of the waveguide 14.

At least part of the plasmon generator 66 is accommodated in the opening 68c of the clad layer 68. In the present embodiment, in particular, the plasmon generator 66 is accommodated in the groove 14b of the waveguide 14, the opening 68c of the clad layer 68 and the opening of the mask layer 51. The dielectric film 52 is provided in the groove 14b of the waveguide 14, the opening 68c of the clad layer 68 and the opening of the mask layer 51 so as to be interposed between the plasmon generator 66 and each of the waveguide 14, the clad layer 68 and the mask layer 51.

The plasmon generator 66 is generally triangular-prism-shaped. Specifically, the plasmon generator 66 has a front end face 66a located in the medium facing surface 40, a rear end face 66b opposite to the front end face, first and second inclined surfaces 66c1 and 66c2, and a top surface 66d. The first inclined surface 66c1 is opposed to the first opening sidewall 68c1 and the first groove sidewall 14b1 with the dielectric film 52 interposed therebetween. The second inclined surface 66c2 is opposed to the second opening sidewall 68c2 and the second groove sidewall 14b2 with the dielectric film 52 interposed therebetween. The top surface 66d connects the first and second inclined surfaces 66c1 and 66c2 to each other.

The plasmon generator 66 further has an edge part 66e that connects the first and second inclined surfaces 66c1 and 66c2 to each other, and a near-field light generating part 66f that is located in the medium facing surface 40 and generates near-field light. The near-field light generating part 66f lies at an end of the edge part 66e. The first and second inclined surfaces 66c1 and 66c2 decrease in distance from each other with decreasing distance to the edge part 66e. The edge part 66e faces the surface of the groove 14b, which is a part of the outer surface of the waveguide 14, with a predetermined distance provided therebetween by the thickness of the dielectric film 52, and extends in the direction perpendicular to the medium facing surface 40 (Y direction). The edge part 66e may be located at a level lower or higher than the top surface 14a of the waveguide 14, or at the same level as the top surface 14a. In a cross section parallel to the medium facing surface 40, the edge part 66e may have the shape of a perfectly pointed edge whereas it may have an arc shape in a microscopic view.

The first inclined surface 66c1 includes an upper part 66c11 and a lower part 66c12 that are continuous with each other. The upper part 66c11 is opposed to the first opening sidewall 68c1 with the dielectric film 52 interposed therebetween. The lower part 66c12 is opposed to the first groove sidewall 14b1 with the dielectric film 52 interposed therebetween.

The second inclined surface 66c2 includes an upper part 66c21 and a lower part 66c22 that are continuous with each other. The upper part 66c21 is opposed to the second opening sidewall 68c2 with the dielectric film 52 interposed therebetween. The lower part 66c22 is opposed to the second groove sidewall 14b2 with the dielectric film 52 interposed therebetween.

As shown in FIG. 16, the upper parts 66c11 and 66c21 and the lower parts 66c12 and 66c22 are each inclined with respect to a virtual plane P parallel to the top surface 14a of the waveguide 14. The angle that the upper part 66c11 forms with respect to the virtual plane P is equal to the angle that the upper part 66c21 forms with respect to the virtual plane P. The angle will hereinafter be represented by θ3. The angle that the lower part 66c12 forms with respect to the virtual plane P is equal to the angle that the lower part 66c22 forms with respect to the virtual plane P. The angle will hereinafter be represented by θ4. The angle θ3 falls within the range of 30 to 60 degrees, for example. The angle θ4 is greater than the angle θ3. In one example, the angle θ3 is 45 degrees and the angle θ4 is 60 degrees.

The front end face 66a has a first side 66a1 that lies at an end of the first inclined surface 66c1, a second side 66a2 that lies at an end of the second inclined surface 66c2, a third side 66a3 that lies at an end of the top surface 66d, and a tip 66a4 that is formed by contact of the first side 66a1 and the second side 66a2 with each other and forms the near-field light generating part 66f. The tip 66a4 may have the shape of a perfectly pointed edge whereas it may have an arc shape in a microscopic view. The radius of curvature of the edge part 66e and that of the tip 66a4 are equal. If the shape of the edge part 66e in the cross section parallel to the medium facing surface 40 and the shape of the tip 66a4 are like a perfectly pointed edge, the radius of curvature of each of the edge part 66e and the tip 66a4 is zero. Hereinafter, the radius of curvature of each of the edge part 66e and the tip 66a4 will be represented by the symbol R1. In one example, the radius of curvature R1 is 10 nm. How to determine the radius of curvature R1 will be described in detail later.

The first side 66a1 includes an upper part 66a11 and a lower part 66a12 that are continuous with each other. The second side 66a2 includes an upper part 66a21 and a lower part 66a22 that are continuous with each other. As shown in FIG. 16, the upper parts 66a11 and 66a21 and the lower parts 66a12 and 66a22 are each inclined with respect to the virtual plane P. The angle that the upper part 66a11 of the first side 66a1 forms with respect to the virtual plane P is equal to the angle θ3 that the upper part 66c11 of the first inclined surface 66c1 forms with respect to the virtual plane P. The angle that the upper part 66a21 of the second side 66a2 forms with respect to the virtual plane P is equal to the angle θ3 that the upper part 66c21 of the second inclined surface 66c2 forms with respect to the virtual plane P.

The angle that the lower part 66a12 of the first side 66a1 forms with respect to the virtual plane P is equal to the angle θ4 that the lower part 66c12 of the first inclined surface 66c1 forms with respect to the virtual plane P. The angle that the lower part 66a22 of the second side 66a2 forms with respect to the virtual plane P is equal to the angle θ4 that the lower part 66c22 of the second inclined surface 66c2 forms with respect to the virtual plane P.

A description will now be given of how to determine the radius of curvature R1. The radius of curvature R1 can be determined in the following manner, for example. Initially, an image of the front end face 66a of the plasmon generator 66 is captured by using a scanning ion microscope (SIM), for example. Next, a circle of appropriate size is drawn on the image so that the circle is inscribed between the lower part 66a12 of the first side 66a1, the lower part 66a22 of the second side 66a2, and the tip 66a4, as shown in FIG. 16. Then, the radius of the circle is determined as the radius of curvature R1.

The dimensions $W_{PG}$, $T_{PG}$, and $H_{PG}$ of the plasmon generator 66 shown in FIG. 14 and FIG. 15 have the same definitions and the same ranges of values as those of the plasmon generator 16 of the first embodiment.

The method of manufacturing the near-field light generator according to the present embodiment will now be described with reference to FIG. 17 to FIG. 20. FIG. 17 to FIG. 20 each show a cross section of a stack of layers in the process of forming the near-field light generator, the cross section being taken in the position where the medium facing surface 40 is to be formed.

Figure 17:
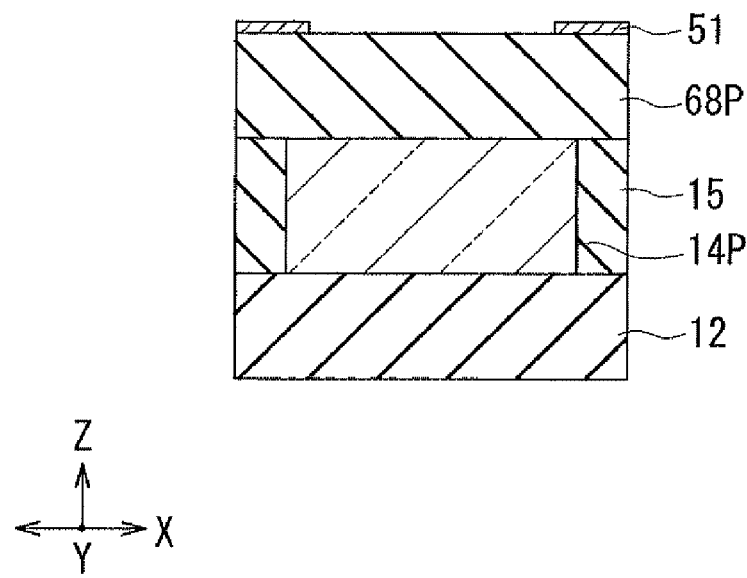
FIG. 17 is a cross-sectional view showing a step of a method of manufacturing a near-field light generator according to the second embodiment of the invention.

FIG. 17 shows a step of the method of manufacturing the near-field light generator according to the present embodiment. In this step, an initial waveguide 14P is formed on the clad layer 12. The initial waveguide 14P is intended to undergo the formation of the groove 14b therein later to thereby become the waveguide 14. Next, the clad layer 15 is formed to cover the initial waveguide 14P. The clad layer 15 is then polished by, for example, CMP, until the top surface of the initial waveguide 14P is exposed. Next, an initial clad layer 68P is formed over the initial waveguide 14 and the clad layer 15. The initial clad layer 68P is intended to undergo the formation of the opening 68c therein later to thereby become the clad layer 68. The initial clad layer 68P is formed into a thickness slightly smaller than the length $T_{PG}$ of the front end face 66a (see FIG. 14 and FIG. 15) in the direction perpendicular to the top surface 66d of the plasmon generator 66 (Z direction) to be formed later. For example, the initial clad layer 68P is formed into a thickness smaller than the length $T_{PG}$ by 20 nm. Next, the mask layer 51 is formed on the initial clad layer 68P.

Figure 18:
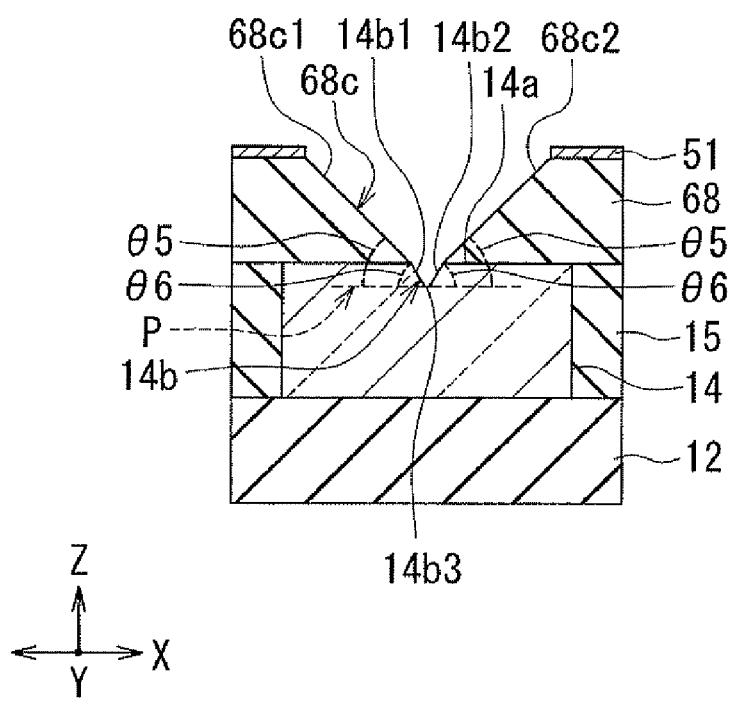
FIG. 18 is a cross-sectional view showing a step that follows the step of FIG. 17.

FIG. 18 shows the next step. In this step, the initial clad layer 68P and the initial waveguide 14P are continuously etched by, for example, RIE, using the mask layer 51 as the etching mask. This step is performed under such a condition that the initial clad layer 68P and the initial waveguide 14P are taper-etched with the etching rate of the initial waveguide 14P higher than that of the initial clad layer 68P. The etching forms the opening 68c in the initial clad layer 68P, thereby making the initial clad layer 68P into the clad layer 68. The etching also forms the groove 14b in the initial waveguide 14P, thereby making the initial waveguide 14P into the waveguide 14.

If the initial clad layer 68P is made of alumina and the initial wave guide 14P is made of tantalum oxide, the continuous etching of the initial clad layer 68P and the initial waveguide 14P is effected by, for example, RIE using an etching gas that contains $Cl_2$ and $BCl_3$, and at least one of $N_2$ and $CF_4$. $Cl_2$ and $BCl_3$ are the main components that contribute to the etching of the initial clad layer 68P and the initial waveguide 14P. $N_2$ and $CF_4$ are gases for forming a sidewall-protecting film on the sidewalls of the etched groove while the etching of the initial clad layer 68P and the initial waveguide 14P is in process. Using the etching gas containing at least one of $N_2$ and $CF_4$ results in the formation of the sidewall-protecting film on the sidewalls of the groove during the etching of the initial clad layer 68P. Consequently, the first and second opening sidewalls 68c1 and 68c2 are formed as surfaces inclined with respect to the virtual plane P. The sidewall-protecting film is also formed on the sidewalls of the groove during the etching of the initial waveguide 14P. Consequently, the first and second groove sidewalls 14b1 and 14b2 are formed as surfaces inclined with respect to the virtual plane P.

The angle that the first opening sidewall 68c1 forms with respect to the virtual plane P is equal to the angle that the second opening sidewall 68c2 forms with respect to the virtual plane P. The angle will hereinafter be represented by the symbol θ5. The angle θ5 can be controlled within the range of, for example, 30 degrees to 60 degrees by changing the ratio of the flow rate of the at least one of $N_2$ and $CF_4$ to the total flow rate of the etching gas.

The angle that the first groove sidewall 14b1 forms with respect to the virtual plane P is equal to the angle that the second groove sidewall 14b2 forms with respect to the virtual plane P. The angle will hereinafter be represented by the symbol θ6. As described previously, the etching of the initial clad layer 68P and the initial waveguide 14P is performed under such a condition that the etching rate of the initial waveguide 14P is higher than that of the initial clad layer 68P. This makes the angle θ6 greater than the angle θ5. In one example, the angle θ5 is 45 degrees and the angle θ6 is 60 degrees. The angle θ3 shown in FIG. 16 is equal to or nearly equal to the angle θ5. The angle θ4 shown in FIG. 16 is equal to or nearly equal to the angle θ6.

One example of the conditions for the etching of the initial clad layer 68P and the initial waveguide 14P other than the etching gas is the same as for the taper-etching of the initial clad layer 18P in the first embodiment.

Figure 19:
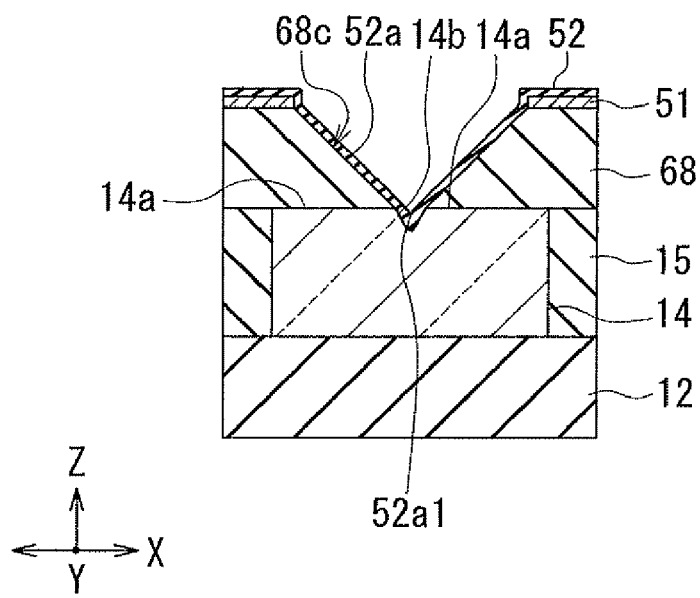
FIG. 19 is a cross-sectional view showing a step that follows the step of FIG. 18.

FIG. 19 shows the next step. In this step, the dielectric film 52 is formed at least in the groove 14b of the waveguide 14, the opening 68c of the clad layer 68 and the opening of the mask layer 51 by ALD, for example. The stack after the formation of the dielectric film 52 has a recess 52a for accommodating the plasmon generator 66 to be formed later. The bottom end 52a1 of the recess 52a may be located at a level lower or higher than the top surface 14a of the waveguide 14, or at the same level as the top surface 14a.

Figure 20:
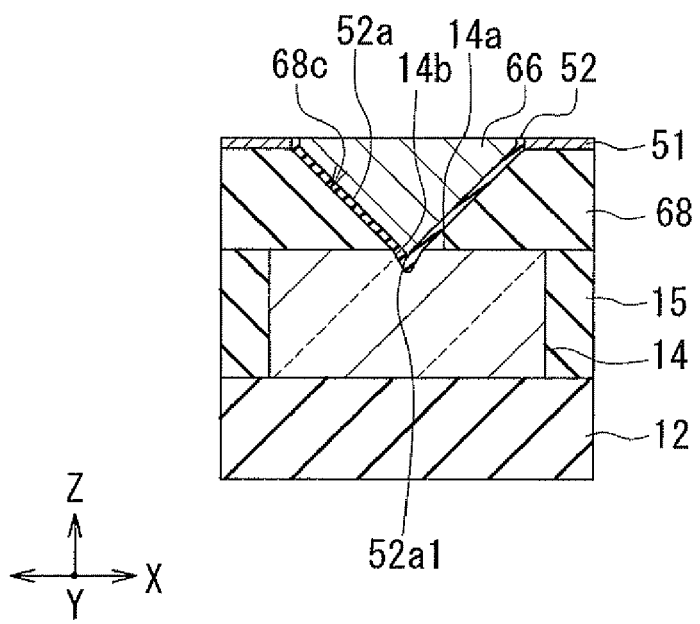
FIG. 20 is a cross-sectional view showing a step that follows the step of FIG. 19.

FIG. 20 shows the next step. In this step, a metal layer that is to become the plasmon generator 66 later is initially formed on the dielectric film 52 by sputtering, for example. The metal layer is formed into a thickness sufficient for at least filling the recess 52a. Next, the dielectric film 52 and the metal layer are polished by, for example, CMP, until the mask layer 51 is exposed. The remaining metal layer thereby becomes the plasmon generator 66.

In the near-field light generator according to the present embodiment, the edge part 66e of the plasmon generator 66 faces the surface of the groove 14b, which is a part of the outer surface of the waveguide 14, with a predetermined distance provided therebetween by the thickness of the dielectric film 52. Surface plasmons are then excited on the edge part 66e through coupling with the evanescent light that occurs at the surface of the groove 14b based on the laser light propagated through the waveguide 14. The surface plasmons are propagated along the edge part 66e to the near-field light generating part 66f. The near-field light generating part 66f generates near-field light based on the surface plasmons.

According to the method of manufacturing the near-field light generator of the present embodiment, the initial clad layer 68P and the initial waveguide 14P are continuously etched by RIE, whereby the opening 68c of the clad layer 68 and the groove 14b of the waveguide 14 are formed. Subsequently, the dielectric film 52 is formed in the opening 68c and the groove 14b, and the plasmon generator 66 is formed on the dielectric film 52. The distance between the outer surface of the wave guide 14 (the surface of the groove 14b) and the edge part 66e of the plasmon generator 66 is thus determined by the thickness of the dielectric film 52. Consequently, according to the present embodiment, it is possible to reduce variations in the distance between the outer surface of the waveguide 14 (the surface of the groove 14b) and the edge part 66e of the plasmon generator 66.

According to the method of manufacturing the near-field light generator of the present embodiment, the first inclined surface 66c1 of the plasmon generator 66 includes the upper part 66c11 and the lower part 66c12 continuous with each other. The second inclined surface 66c2 of the plasmon generator 66 includes the upper part 66c21 and the lower part 66c22 continuous with each other. The angles θ4 that the lower parts 66c12 and 66c22 form with respect to the virtual plane P parallel to the top surface 14a of the waveguide 14 are greater than the angles that the upper parts 66c11 and 66c21 form with respect to the virtual plane P. Such a configuration can reduce the radius of curvature R1 of the tip 66a4 which forms the near-field light generating part 66f in the front end face 66a of the plasmon generator 66. Consequently, according to the present embodiment, it is possible to reduce the spot diameter of the near-field light occurring from the near-field light generating part 66f.

Figure 21:
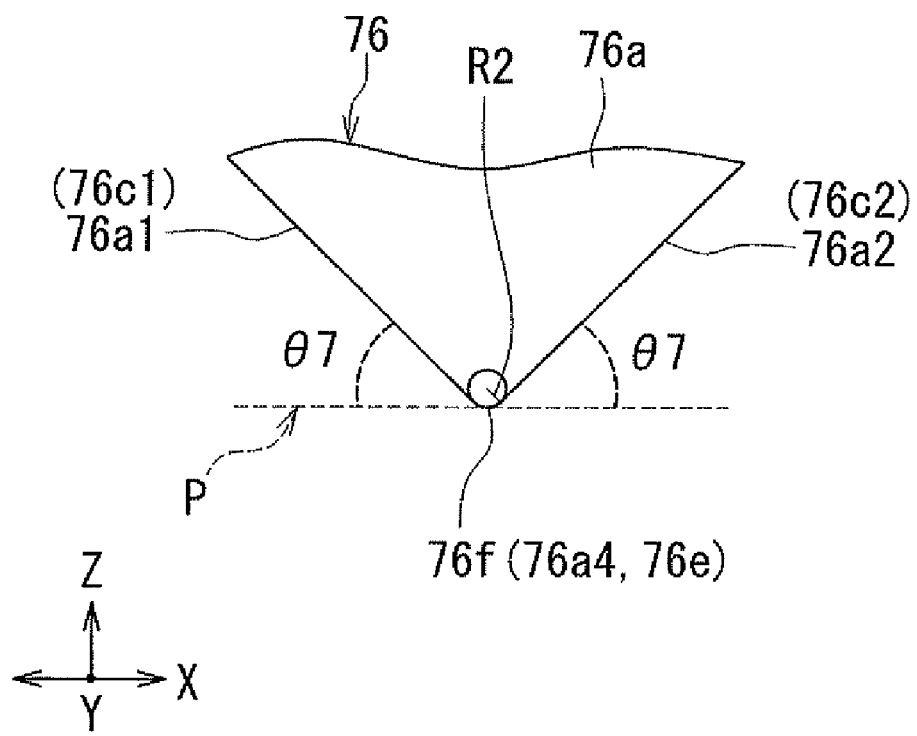
FIG. 21 is a magnified partial front view of a plasmon generator of a comparative example.

Next, it will be described that the radius of curvature R1 of the tip 66a4 constituting the near-field light generating part 66f can be reduced according to the plasmon generator 66 of the present embodiment in comparison with a plasmon generator 76 of a comparative example shown in FIG. 21. FIG. 21 is a magnified partial front view of the plasmon generator 76 of the comparative example.

The plasmon generator 76 of the comparative example shown in FIG. 21 is formed by the following method. In the method, the groove 14b is not formed in the waveguide 14, and the initial clad layer 68P is taper-etched so that a recess for accommodating the plasmon generator 76 is formed in the clad layer 68. Next, the dielectric film 52 is formed in the recess, and the plasmon generator 76 is formed on the dielectric film 52. The recess of the clad layer 68 has first and second sidewalls that decrease in distance from each other with decreasing distance to the top surface 14a of the waveguide 14.

The plasmon generator 76 is generally triangular-prism-shaped. Specifically, the plasmon generator 76 has a front end face 76a located in the medium facing surface 40, a rear end face (not shown) opposite to the front end face, first and second inclined surfaces 76c1 and 76c2, and a top surface (not shown). The plasmon generator 76 further has an edge part 76e that connects the first and second inclined surfaces 76c1 and 76c2 to each other, and a near-field light generating part 76f that is located in the medium facing surface 40 and generates near-field light. The near-field light generating part 76f lies at an end of the edge part 76e. The first and second inclined surfaces 76c1 and 76c2 decrease in distance from each other with decreasing distance to the edge part 76e.

The front end face 76a has a first side 76a1 that lies at an end of the first inclined surface 76c1, a second side 76a2 that lies at an end of the second inclined surface 76c2, and a tip 76a4 that is formed by contact of the first side 76a1 and the second side 76a2 with each other and forms the near-field light generating part 76f. The edge part 76e is arc-shaped in cross section parallel to the medium facing surface 40, and the tip 76a4 is also arc-shaped. The radius of curvature of each of the edge part 76e and the tip 76a4 will hereinafter be represented by the symbol R2. The angles that the first and second inclined surfaces 76c1 and 76c2 and the first and second sides 76a1 and 76a2 form with respect to a virtual plane P parallel to the top surface 14a of the waveguide 14 will be represented by the symbol θ7.

Now, a comparison will be made between the radius of curvature R2 of the comparative example and the radius of curvature R1 of the present embodiment, on the assumption that the angle θ7 of the comparative example and the angle θ3 of the present embodiment (see FIG. 16) are equal. In such a case, the angle θ4 of the present embodiment (see FIG. 16) is greater than the angles θ3 and θ7. The angle formed between the lower parts 66a12 and 66a22 of the first and second sides 66a1 and 66a2 of the present embodiment (the angle formed between the lower parts 66c12 and 66c22 of the first and second inclined surfaces 66c1 and 66c2) is thus smaller than that formed between the first and second sides 76a1 and 76a2 of the comparative example (the angle formed between the first and second inclined surfaces 76c1 and 76c2). Consequently, the tip 66a4 of the present embodiment is formed more sharply than the tip 76a4 of the comparative example. The radius of curvature R1 of the present embodiment is therefore smaller than the radius of curvature R2 of the comparative example. For example, given that the angles θ3 and θ7 are each 45 degrees and the angle θ4 is 60 degrees, the radius of curvature R2 of the comparative example is 20 nm, and the radius of curvature R1 of the present embodiment is 10 nm.

As has been described, according to the present embodiment, it is possible to reduce variations in the distance between the outer surface of the waveguide 14 (the surface of the groove 14b) and the edge part 66e of the plasmon generator 66, and to reduce the radius of curvature R1 of each of the edge part 66e and the tip 66a4 of the plasmon generator 66 so that the near-field light has a smaller spot diameter.

The remainder of configuration, function and effects of the present embodiment are similar to those of the first embodiment.

The present invention is not limited to the foregoing embodiments, and various modifications may be made thereto. For example, the plasmon generator may have a shape other than the shapes shown in FIG. 1 and FIG. 14.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a near-field light generator, the near-field light generator comprising:
   a waveguide that propagates light and has a top surface;
   a clad layer that has a bottom surface in contact with the top surface of the waveguide, a top surface opposite to the bottom surface, and an opening penetrating from the top surface to the bottom surface;
   a plasmon generator that is accommodated in the opening at least in part; and
   a dielectric film that is provided in the opening so as to be interposed between the plasmon generator and each of the waveguide and the clad layer, wherein:
   each of the clad layer and the dielectric film has a refractive index lower than that of the waveguide;
   the opening has a first opening sidewall and a second opening sidewall that decrease in distance from each other with decreasing distance to the top surface of the waveguide;
   the plasmon generator has a first inclined surface that is opposed to the first opening sidewall, a second inclined surface that is opposed the second opening sidewall, an edge part that connects the first and second inclined surfaces to each other, and a near-field light generating part that lies at an end of the edge part and generates near-field light; and a surface plasmon is excited on the edge part through coupling with evanescent light that occurs at the top surface of the waveguide based on the light propagated through the waveguide, the surface plasmon is propagated along the edge part to the near-field light generating part, and the near-field light generating part generates near-field light based on the surface plasmon, the method comprising the steps of:
forming the waveguide;
forming an initial clad layer on the waveguide, the initial clad layer being intended to undergo the formation of the opening therein later to thereby become the clad layer;
etching the initial clad layer by reactive ion etching so that a recess that does not reach the top surface of the waveguide is formed in the initial clad layer;
etching the recess by wet etching until the top surface of the waveguide is exposed in part, so that the recess becomes the opening and the initial clad layer becomes the clad layer;
forming the dielectric film in the opening; and
forming the plasmon generator on the dielectric film.

2. The method of manufacturing the near-field light generator according to claim 1, wherein the initial clad layer is formed of alumina, and the step of etching the initial clad layer uses an etching gas that contains $Cl_2$ and $BCl_3$, and at least one of $N_2$ and $CF_4$.

3. The method of manufacturing the near-field light generator according to claim 1, wherein the step of etching the recess is performed under such a condition that the etching stops at the top surface of the waveguide.

4. The method of manufacturing the near-field light generator according to claim 3, wherein the waveguide is formed of tantalum oxide, the initial clad layer is formed of alumina, and the step of etching the recess uses an etchant that contains tetramethyl ammonium hydroxide or KOH.

5. The method of manufacturing the near-field light generator according to claim 1, wherein the dielectric film is formed by atomic layer deposition.

6. A method of manufacturing a near-field light generator, the near-field light generator comprising:
   a waveguide that propagates light and has a top surface and a groove, the groove being opened in the top surface and being oblong in a direction parallel to the top surface;
   a clad layer that has a bottom surface in contact with the top surface of the waveguide, a top surface opposite to the bottom surface, and an opening penetrating from the top surface to the bottom surface, the opening being continuous with the groove;
   a plasmon generator that is accommodated in the opening at least in part; and
   a dielectric film that is provided in the groove and the opening so as to be interposed between the plasmon generator and each of the waveguide and the clad layer, wherein:
   each of the clad layer and the dielectric film has a refractive index lower than that of the waveguide;
   the opening has a first opening sidewall and a second opening sidewall that decrease in distance from each other with decreasing distance to the top surface of the waveguide;
   the groove has a first groove sidewall that is continuous with the first opening sidewall, and a second groove sidewall that is continuous with the second opening sidewall;
   the plasmon generator has a first inclined surface that is opposed to the first opening sidewall and the first groove sidewall, a second inclined surface that is opposed to the second opening sidewall and the second groove sidewall, an edge part that connects the first and second inclined surfaces to each other, and a near-field light generating part that lies at an end of the edge part and generates near-field light; and a surface plasmon is excited on the edge part through coupling with evanescent light that occurs at a surface of the groove based on the light propagated through the waveguide, the surface plasmon is propagated along the edge part to the near-field light generating part, and the near-field light generating part generates near-field light based on the surface plasmon, the method comprising the steps of:

forming an initial waveguide that is intended to undergo the formation of the groove therein later to thereby become the waveguide;

forming an initial clad layer on the initial waveguide, the initial clad layer being intended to undergo the formation of the opening therein later to thereby become the clad layer;

continuously etching the initial clad layer and the initial waveguide by reactive ion etching so that the opening and the groove are formed, whereby the initial waveguide becomes the waveguide and the initial clad layer becomes the clad layer;

forming the dielectric film in the opening and the groove; and forming the plasmon generator on the dielectric film, wherein:

the step of continuously etching the initial clad layer and the initial waveguide is performed under such a condition that the initial waveguide has en etching rate higher than that of the initial clad layer, so that the first and second groove sidewalls form greater angles with respect to a virtual plane parallel to the top surface of the waveguide than angles that the first and second opening sidewalls form with respect to the virtual plane, respectively; and the formation of the dielectric film in the opening and the groove and the formation of the plasmon generator on the dielectric film result in that each of the first and second inclined surfaces includes an upper part and a lower part that are continuous with each other and the lower parts of the first and second inclined surfaces form greater angles with respect to the virtual plane than angles that the upper parts of the first and second inclined surfaces form with respect to the virtual plane, respectively.

7. The method of manufacturing the near-field light generator according to claim 6, wherein the initial waveguide is formed of tantalum oxide, the initial clad layer is formed of alumina, and the step of continuously etching the initial clad layer and the initial waveguide uses an etching gas that contains $Cl_2$ and $BCl_3$, and at least one of $N_2$ and $CF_4$.

8. The method of manufacturing the near-field light generator according to claim 6, wherein the dielectric film is formed by atomic layer deposition.

* * * * *